United States Patent
Kitazato et al.

(10) Patent No.: US 11,678,022 B2
(45) Date of Patent: *Jun. 13, 2023

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventors: Naohisa Kitazato, Tokyo (JP); Yasuaki Yamagishi, Kanagawa (JP); Jun Kitahara, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,248

(22) Filed: Nov. 9, 2020

(65) Prior Publication Data
US 2021/0058680 A1 Feb. 25, 2021

Related U.S. Application Data

(63) Continuation of application No. 15/527,404, filed as application No. PCT/JP2015/081523 on Nov. 9, 2015, now Pat. No. 10,869,099.

(30) Foreign Application Priority Data

Nov. 26, 2014 (JP) ................................ 2014-239386

(51) Int. Cl.
*H04N 21/485* (2011.01)
*H04N 21/235* (2011.01)
(Continued)

(52) U.S. Cl.
CPC .......... *H04N 21/4858* (2013.01); *H04J 3/00* (2013.01); *H04L 65/75* (2022.05); *H04N 5/76* (2013.01);
(Continued)

(58) Field of Classification Search
CPC ............... H04N 21/236; H04N 21/435; H04N 7/17318; H04N 7/165; H04N 7/173
See application file for complete search history.

(56) References Cited

U.S. PATENT DOCUMENTS

2001/0052126 A1* 12/2001 Nanki .............. H04N 21/47214
725/55
2002/0057380 A1* 5/2002 Matey ................ H04N 21/4341
348/731

(Continued)

FOREIGN PATENT DOCUMENTS

EP 2 784 953 A1 10/2014
EP 3 169 073 A1 5/2017
(Continued)

OTHER PUBLICATIONS

Extended European Search Report dated May 28, 2018 in corresponding European Patent Application No. 15862320.7 citing documents AA, AB, AO, AP and AX therein, 8 pages.

(Continued)

*Primary Examiner* — Yassin Alata
(74) *Attorney, Agent, or Firm* — Oblon, McClelland, Maier & Neustadt, L.L.P.

(57) ABSTRACT

A technique capable of allowing a reception side to easily select components is provided. A transport stream in which a first transport packet including predetermined components and a second transport packet including signaling information related to the predetermined components are time-division multiplexed is transmitted via a predetermined transport path. Component selection information is inserted in the second transport packet. The component selection information includes information on a selective layer in which static selection is performed, information on a composite layer in which composition is performed, and information on an adaptive layer in which dynamic switching is (Continued)

performed, and these layers being arranged in that order from top to bottom. The acquisition destination information of a component which is a target of adaptive switching among the components selectable in the adaptive layer is information that designates specific information location of a metafile having data stream acquisition information for adaptive streaming.

20 Claims, 39 Drawing Sheets

(51) Int. Cl.
    *H04N 21/2362*     (2011.01)
    *H04N 21/435*     (2011.01)
    *H04J 3/00*     (2006.01)
    *H04N 5/76*     (2006.01)
    *H04L 65/75*     (2022.01)
    *H04N 21/236*     (2011.01)
    *H04N 21/4402*     (2011.01)

(52) U.S. Cl.
    CPC ....... *H04N 21/235* (2013.01); *H04N 21/2362* (2013.01); *H04N 21/23605* (2013.01); *H04N 21/435* (2013.01); *H04N 21/440236* (2013.01); *H04N 21/4856* (2013.01)

(56) References Cited

U.S. PATENT DOCUMENTS

| | | | |
|---|---|---|---|
| 2013/0081088 A1 | 3/2013 | Hwang et al. | |
| 2013/0148029 A1 | 6/2013 | Gish | |
| 2014/0189772 A1* | 7/2014 | Yamagishi | H04N 21/2225 725/116 |
| 2014/0317674 A1* | 10/2014 | Hwang | H04N 21/631 725/118 |
| 2014/0334504 A1 | 11/2014 | Yie et al. | |
| 2017/0064371 A1* | 3/2017 | Kitazato | H04N 21/43074 |
| 2017/0142453 A1 | 5/2017 | Kitazato | |

FOREIGN PATENT DOCUMENTS

| | | |
|---|---|---|
| JP | 2013/153291 A | 8/2013 |
| JP | 2013/538508 A1 | 10/2013 |
| KR | 20130057404 A | 5/2013 |
| KR | 20130119885 A | 11/2013 |
| KR | 20140103101 A | 8/2014 |
| WO | WO-2010021694 A1 | 2/2010 |
| WO | 2011/151960 A1 | 12/2011 |
| WO | 2012/157756 A1 | 11/2012 |
| WO | 2013/043000 A1 | 3/2013 |

OTHER PUBLICATIONS

Shuichi Aoki et al., "Effective Usage of MMT in Broadcasting Systems", Broadband Multimedia Systems and Broadcasting (BMSB), IEEE, XP32495764, Jun. 5, 2013, pp. 1-6.

"Information technology—High efficiency coding and media delivery in heterogeneous environments—Part 1: MPEG media transport (MMT)", ISO/IEC JTC 1/SC 29, ISO/IEC JTC 1/SC 29/WG 11, Apr. 26, 2013.

* cited by examiner

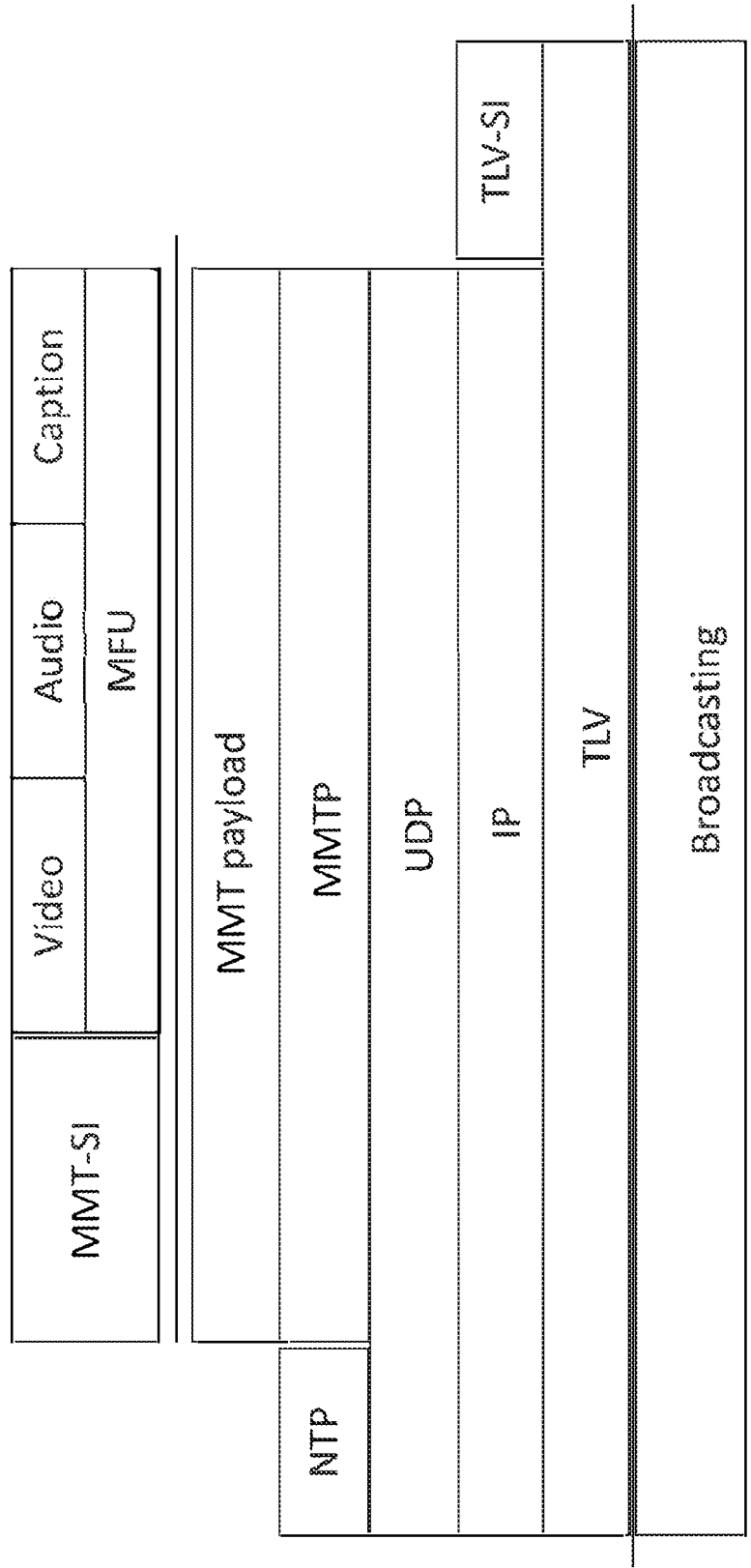

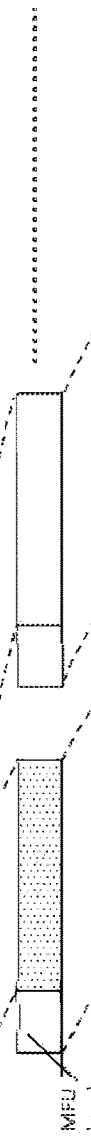
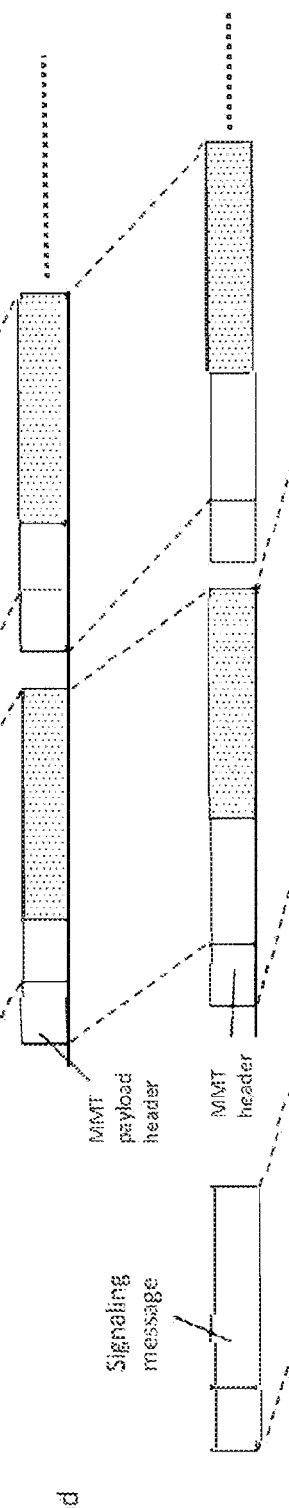
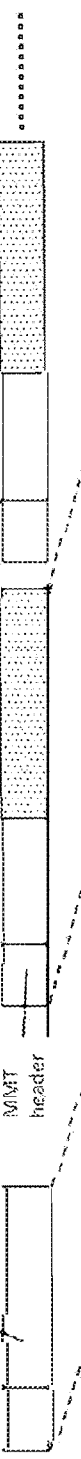
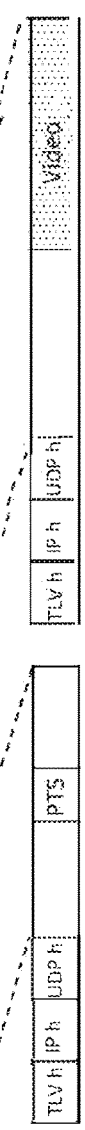

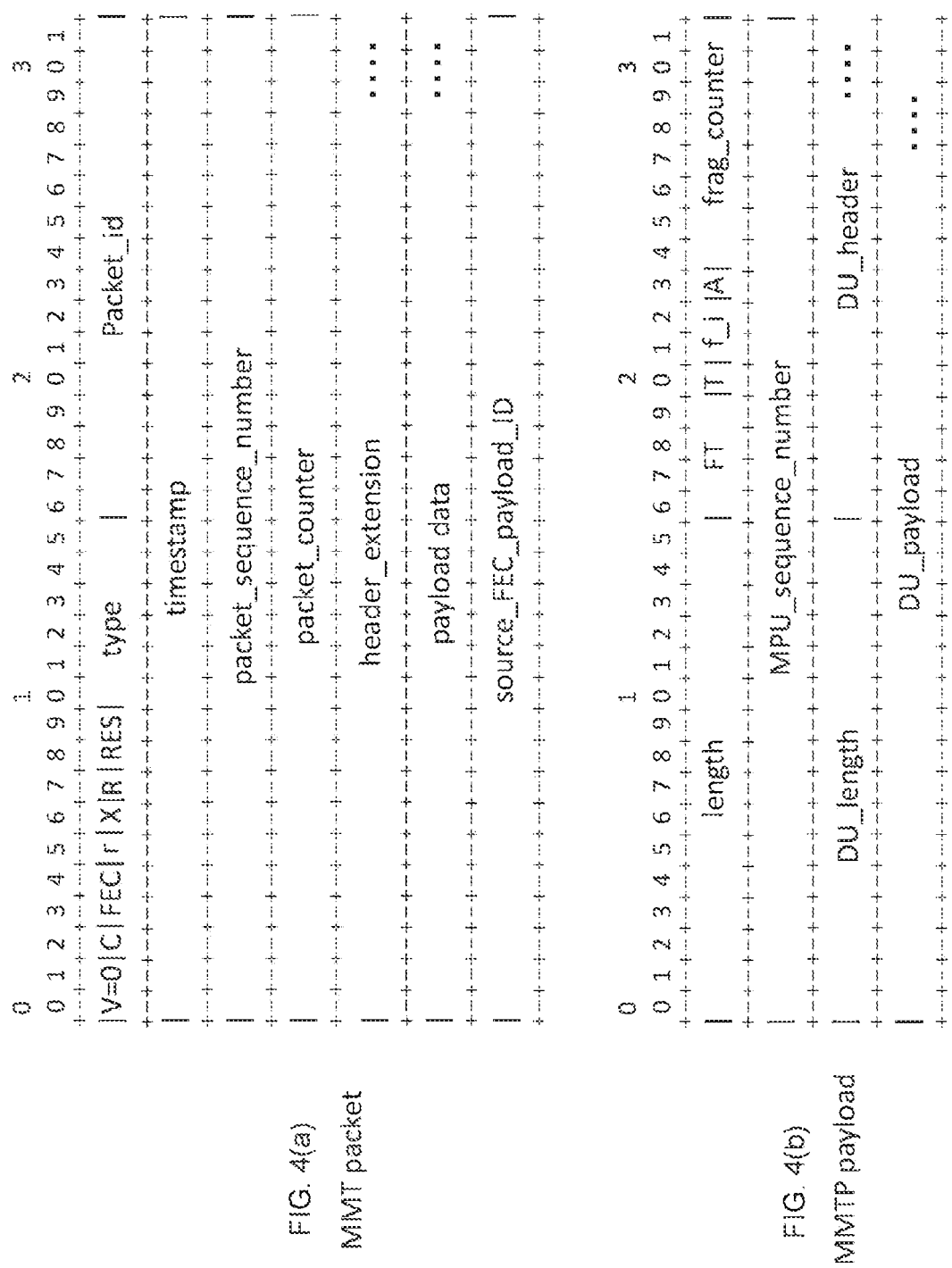

FIG. 9(a)

Media Presentation
- Period, start=0s
  ...
- Period, start=100s
  ...
- Period, start=295s
  ...

FIG. 9(b)

Period, start=100s
- baseURL=http://www.e.com/
- ...
- AdaptationSet 1 Video
- AdaptationSet 2 Video
- AdaptationSet 11 Audio
- ...

FIG. 9(c)

AdaptationSet
- Representation 1 500kbit/s
- Representation 2 1Mbit/s
- ...

FIG. 9(d)

Representation
- bandwidth=500kbit/s
- width 640, height 460
- ...

Segment info
- duration=10s
- Template: /ahs-5-$index$.3gs

FIG. 9(e)

Segment Info
- Initialization Segment
  http://www.e.com/ahs-5.3gp
- Media Segment 1
  Start=0s
  http://www.e.com/ahs-5-1.3gp
- Media Segment 2
  Start=10s
  http://www.e.com/ahs-5-2.3gp
- Media Segment 3
  Start=20s
  http://www.e.com/ahs-5-3.3gp
- ......
- Media Segment 20
  Start=190s
  http://www.e.com/ahs-5-20.3gp

FIG. 12

DESCRIPTION OF parameters OF PA Message

| ITEM | ITEM NAME IN JAPANESE | DESCRIPTION |
|---|---|---|
| message_id | MESSAGE ID | FIXED VALUE FOR IDENTIFYING PA message IN VARIOUS ITEMS OF SIGNALING INFORMATION. |
| version | VERSION | INDICATES VERSION OF PA Message. 8-bit INTEGER VALUE. INCREMENTED BY +1 EVEN WHEN ONLY PORTION OF PARAMETERS THAT FORM MPT IS UPDATED. |
| length | TABLE LENGTH | NUMBER OF BYTES OF PA Message. COUNTING STARTS IMMEDIATELY AFTER THIS FIELD. |

FIG. 13

DESCRIPTION OF parameters OF MP table

| ITEM | ITEM NAME IN JAPANESE | DESCRIPTION |
|---|---|---|
| table_id | TABLE ID | FIXED VALUE FOR IDENTIFYING MP table IN VARIOUS ITEMS OF SIGNALING INFORMATION. |
| version | VERSION | INDICATES VERSION OF MPT. 8-bit INTEGER VALUE. INCREMENTED BY +1 EVEN WHEN ONLY PORTION OF PARAMETERS THAT FORM MPT IS UPDATED. |
| length | TABLE LENGTH | NUMBER OF BYTES OF MP table. COUNTING STARTS IMMEDIATELY AFTER THIS FIELD. |
| Package_id | PACKAGE ID | IDENTIFICATION INFORMATION OF ENTIRE PACKAGE MADE UP OF ALL SIGNALS AND FILES TRANSPORTED OVER BROADCAST SIGNALS. |
| MPT_descriptors | MPT DESCRIPTOR AREA | STORAGE AREA OF DESCRIPTORS ASSOCIATED WITH ENTIRE PACKAGE. ASSUMED THAT DESCRIPTORS OF VARIOUS PURPOSES ARE DEFINED AND ONE OR PLURALITY OF DESCRIPTORS ARE DISPOSED. |
| Number_of_assets | NUMBER OF ASSETS | NUMBER OF SIGNALS (ASSETS) AS ELEMENTS THAT FORM PACKAGE. A NUMBER OF FOLLOWING ASSET LOOPS CORRESPONDING TO THIS NUMBER ARE DISPOSED. |
| Asset_id | ASSET ID | ID THAT UNIQUELY IDENTIFIES ASSET |
| gen_loc_info | GENERAL LOCATION INFORMATION | INDICATES LOCATION OF ACQUISITION DESTINATION OF ASSET |
| Asset_descriptors | Asset DESCRIPTOR AREA | STORAGE AREA OF DESCRIPTORS ASSOCIATED WITH ASSET. DESCRIPTORS OF VARIOUS PURPOSES ARE DEFINED AND ONE OR PLURALITY OF DESCRIPTORS ARE DISPOSED. |

FIG. 14

| Syntax | Value | No. of Bits | Format |
|---|---|---|---|
| PA_message() { | | | |
|   message_id | | 16 | uimsbf |
|   version | | 8 | uimsbf |
|   length | | 32 | umisbf |
|   extention { | | | |
|     number_of_tables | N1 | | |
|     for (i=0; i<N1; i++) { | | | |
|       table_id | | 8 | |
|       table_version | | 8 | |
|       table_length | | 16 | |
|     } | | | |
|   } | | | |
|   message_payload { | | | |
|     for (i=0; i<N1; i++) { | | | |
|       table() | | | |
|     } | | | |
|   } | | | |
| } | | | |

FIG. 15

| Syntax | Value | No. of Bits | Format |
|---|---|---|---|
| MPT ( ) { | | | |
|   table_id | | 8 | uimsbf |
|   version | | 8 | uimsbf |
|   length | | 16 | uimsbf |
|   if (table_id == SUBSET_0_MPT_TABLE_ID) { | | | |
|     MMT_package_id { | | | |
|       MMT_package_id_length | N1 | 8 | uimsbf |
|       for (i=0; i<N1; i++) { | | | |
|         MMT_package_id_byte | | 8 | uimsbf |
|       } | | | |
|     } | | | |
|   } | | | |
|   MPT_descriptors { | | | |
|     MPT_descriptors_length | N2 | 16 | uimsbf |
|     for (i=0; i<N2; i++) { | | | |
|       MP_table_descriptors_byte | | 8 | uimsbf |
|     } | | | |
|   } | | | |
|   number_of_assets | N3 | 8 | uimsbf |
|   for (i=0; i<N3; i++) { | | | |
|     asset_id { | | | |
|       asset_id_length | N4 | 8 | uimsbf |
|       for (i=0; i<N4; i++) { | | | |
|         asset_id_byte | | 8 | uimsbf |
|       } | | | |
|     } | | | |
|     reserved | '1111111' | 7 | bslbf |
|     asset_clock_relation_flag | | 1 | bslbf |
|     if (asset_clock_relation_flag == 1) { | | | |
|       asset_clock_relation_id | | | |
|       reserved | '1111111' | 7 | bslbf |
|       asset_timescale_flag | | 1 | bslbf |
|       if (asset_timescale_flag == 1) { | | | |
|         asset_timescale | | | |
|       } | | | |
|     } | | | |
|     asset_location { | | | |
|       location_count | N6 | 8 | uimsbf |
|       for (i=0; i<N6; i++) { | | | |
|         MMT_general_location_info() | | | |
|       } | | | |
|     } | | | |
|     asset_descriptors { | | | |
|       asset_descriptors_length | N5 | 16 | uimsbf |
|       for (i=0; i<N5; i++) { | | | |
|         asset_descriptors_byte | | 8 | uimsbf |
|       } | | | |
|     } | | | |
|   } | | | |
| } | | | |

FIG. 16

| Syntax | Value | No. of Bits | Format |
|---|---|---|---|
| MMT_general_location_info() { | | | |
|     location_type | | 8 | uimsbf |
|     if (location_type == 0x00) { | | | |
|         packet_id | | 16 | uimsbf |
|     } else if (location_type == 0x01) { | | | |
|         ipv4_src_addr | | 32 | uimsbf |
|         ipv4_dst_addr | | 32 | uimsbf |
|         dst_port | | 16 | uimsbf |
|         packet_id | | 16 | uimsbf |
|     } else if (location_type == 0x02) { | | | |
|         ipv6_src_addr | | 128 | uimsbf |
|         ipv6_dst_addr | | 128 | uimsbf |
|         dst_port | | 16 | uimsbf |
|         packet_id | | 16 | uimsbf |
|     } else if (location_type == 0x03) { | | | |
|         network_id | | 16 | uimsbf |
|         MPEG_2_transport_stream_id | | 16 | uimsbf |
|         reserved | '111' | 3 | bslbf |
|         MPEG_2_PID | | 13 | uimsbf |
|     } else if (location_type == 0x04) { | | | |
|         ipv6_src_addr | | 128 | uimsbf |
|         ipv6_dst_addr | | 128 | uimsbf |
|         dst_port | | 16 | uimsbf |
|         reserved | '111' | 3 | bslbf |
|         MPEG_2_PID | | 13 | uimsbf |
|     } else if (location_type == 0x05) { | | | |
|         URL_length | N1 | 8 | uimsbf |
|         for (i=0; i<N1; i++) { | | | |
|             URL_byte | | 8 | uimsbf |
|         } | | | |
|     } | | | |
|     ⋮ | | | |

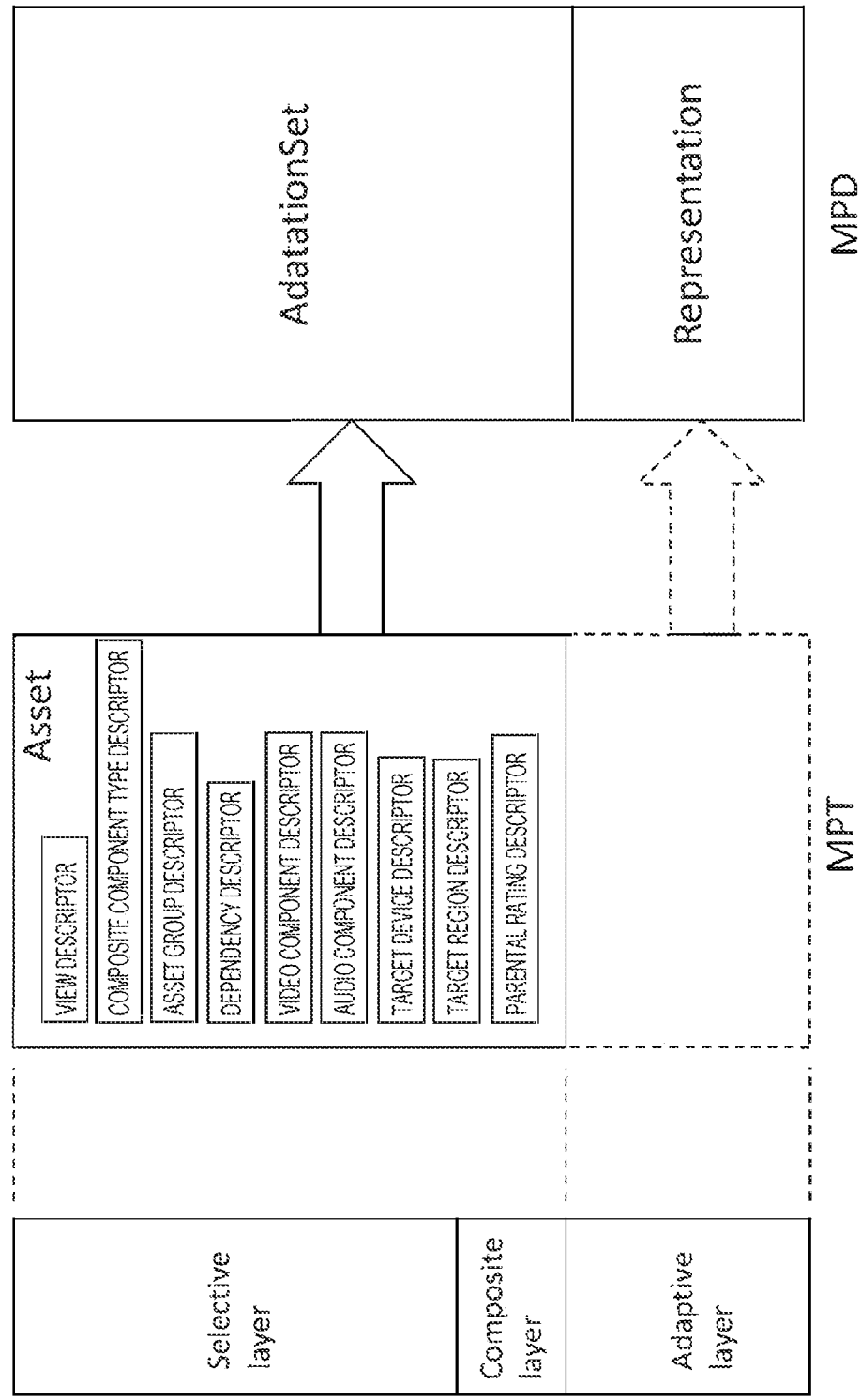

FIG. 20(a)
```
if(location_type=0x0D){
    period_id              16
    adaptationSet_id       16
    representation_id      16
}
```

FIG. 20(b)
```
if(location_type=0x0D){
    period_id              16
    adaptationSet_id       16
}
```

METHOD 2: mapping DASH AdaptationSet TO MMT Asset

FIG. 24

VIEW DESCRIPTOR

| DATA STRUCTURE | NUMBER OF BITS | BIT STRING EXPRESSION | DESCRIPTION |
|---|---|---|---|
| View_Descriptor(){ | | | |
| descriptor_tag | 16 | uimsbf | DESCRIPTOR TAG |
| descriptor_length | 8 | uimsbf | DESCRIPTOR LENGTH |
| view_tag | 8 | uimsbf | VIEW TAG: IDENTIFICATION INFORMATION OF VIDEO CONTENT |
| for(i=0;i<N;i++){ | | | |
| view_name_byte | 8 | bslbf | VIEW NAME: NAME OF VIDEO CONTENT |
| } | | | |
| } | | | |

FIG. 25

COMPOSITE COMPONENT TYPE DESCRIPTOR

| DATA STRUCTURE | NUMBER OF BITS | BIT STRING EXPRESSION | DESCRIPTION |
|---|---|---|---|
| Composite_Component_Type_Descriptor(){ | | | |
| descriptor_tag | 16 | uimsbf | DESCRIPTOR TAG |
| descriptor_length | 8 | uimsbf | DESCRIPTOR LENGTH |
| composite_component_type | 8 | bslbf | COMPOSITE COMPONENT TYPE |
| } | | | |

FIG. 26

ASSET GROUP DESCRIPTOR

| DATA STRUCTURE | NUMBER OF BITS | BIT STRING EXPRESSION | DESCRIPTION |
|---|---|---|---|
| Asset_Group_Descriptor(){ | | | |
| descriptor_tag | 16 | uimsbf | DESCRIPTOR TAG |
| descriptor_length | 8 | uimsbf | DESCRIPTOR LENGTH |
| group_identification | 8 | uimsbf | GROUP ID |
| selection_level | 8 | uimsbf | SELECTION LEVEL |
| } | | | |

FIG. 27

DEPENDENCY DESCRIPTOR

| DATA STRUCTURE | NUMBER OF BITS | BIT STRING EXPRESSION | DESCRIPTION |
|---|---|---|---|
| Dependency_Descriptor(){ | | | |
| descriptor_tag | 16 | uimsbf | DESCRIPTOR TAG |
| descriptor_length | 16 | uimsbf | DESCRIPTOR LENGTH |
| num_dependencies | 8 | uimsbf | NUMBER OF DEPENDENT ASSETS |
| for(i=0;i<N;i++){ | | | |
| asset_id_scheme | 32 | uimsbf | ASSET ID FORMAT |
| asset_id_length | 8 | uimsbf | ASSET ID LENGTH |
| for(j=0;j<M;j++){ | | | |
| asset_id_byte | 8 | uimsbf | ASSET ID |
| } | | | |
| } | | | |
| } | | | |

FIG. 28

VIDEO COMPONENT DESCRIPTOR

| DATA STRUCTURE | NUMBER OF BITS | BIT STRING EXPRESSION | DESCRIPTION |
|---|---|---|---|
| Video_Component_Descriptor(){ | | | |
| descriptor_tag | 16 | uimsbf | DESCRIPTOR TAG |
| descriptor_length | 16 | uimsbf | DESCRIPTOR LENGTH |
| video_resolution | 4 | uimsbf | RESOLUTION 1:180, 2:240, 3:480, 4:720, 5:1080, 6:2160, 7:4320 |
| video_aspect_ratio | 4 | uimsbf | ASPECT RATIO 1:4:3, 2: 16:9wPV, 3 16:9 wo PV, 4: 16:9 OR HIGHER |
| video_scan_flag | 1 | bslbf | SCAN FLAG 0:interlace, 1:progressive |
| reserved | 2 | bslbf | |
| video_frame_rate | 5 | uimsbf | FRAME RATE 1:15, 2:24/1.001, 3:24, 4:25, 5:30/1.001, 6:30, 7:50, 8:60/1.001, 9:60, 10:100, 11:120/1.001, 12:120 |
| component_tag | 16 | uimsbf | COMPONENT TAG |
| ISO_639_language_code | 24 | bslbf | LANGUAGE CODE |
| for(i=0;i<N;i++){ | | | |
| text_char | 8 | uimsbf | COMPONENT DESCRIPTION |
| } | | | |
| } | | | |

FIG. 29

AUDIO COMPONENT DESCRIPTOR

| DATA STRUCTURE | NUMBER OF BITS | BIT STRING EXPRESSION | DESCRIPTION |
|---|---|---|---|
| Audio_Component_Descriptor(){ | | | |
| descriptor_tag | 16 | uimsbf | DESCRIPTOR TAG |
| descriptor_length | 16 | uimsbf | DESCRIPTOR LENGTH |
| reserved | 4 | bslbf | |
| stream_content | 4 | uimsbf | COMPONENT CONTENT |
| component_type | 8 | uimsbf | COMPONENT TYPE |
| component_tag | 16 | uimsbf | COMPONENT TAG |
| stream_type | 8 | uimsbf | STREAM FORMAT TYPE |
| simulcast_group_tag | 8 | bslbf | SIMULCAST GROUP IDENTIFICATION |
| ES_multi_lingual_flag | 1 | bslbf | ES MULTI-LINGUAL FLAG |
| main_component_flag | 1 | bslbf | MAIN COMPONENT FLAG |
| quality_indicator | 2 | bslbf | AUDIO QUALITY DISPLAY |
| sampling_rate | 3 | uimsbf | SAMPLING FREQUENCY 1:16KHz, 2:22.05KHz, 3:24KHz, 4::reserved 5: 32KHz, 6:44.1KHz, 7:48KHz |
| reserved | 1 | bslbf | |
| ISO_639_language_code | 24 | bslbf | LANGUAGE CODE |
| if(ES_multi-lingual_flag==1){ | | | |
| ISO_639_language_code_2 | 24 | bslbf | LANGUAGE CODE 2 |
| } | | | |
| for(i=0;i<N;i++){ | | | |
| text_char | 8 | uimsbf | L COMPONENT DESCRIPTION |
| } | | | |
| } | | | |

FIG. 30

TARGET DEVICE DESCRIPTOR

| DATA STRUCTURE | NUMBER OF BITS | BIT STRING EXPRESSION | DESCRIPTION |
|---|---|---|---|
| Target_Device_Descriptor(){ | | | |
| descriptor_tag | 16 | uimsbf | DESCRIPTOR TAG |
| descriptor_length | 8 | uimsbf | DESCRIPTOR LENGTH |
| number_of_taget_device | 8 | bslbf | NUMBER OF TARGET DEVICES |
| for(i=0;i<number_of_target_device;i++){ | 1 | bslbf | |
| target_device_type | 8 | bslbf | TARGET DEVICE TYPE |
| } | 5 | bslbf | |
| } | | | |

FIG. 31

TARGET REGION DESCRIPTOR

| DATA STRUCTURE | NUMBER OF BITS | BIT STRING EXPRESSION | DESCRIPTION |
|---|---|---|---|
| Target_Region_Descriptor(){ | | | |
| descriptor_tag | 16 | uimsbf | DESCRIPTOR TAG |
| descriptor_length | 8 | uimsbf | DESCRIPTOR LENGTH |
| region_spec_type | 8 | bslbf | DESIGNATION OF REGION DESCRIPTION SCHEME 1: PREFECTURAL AREA |
| target_region_spec() | | | REGION SPECIFIER: REGION DESIGNATION DATA DEFINED FOR EACH DESIGNATION OF REGION DESCRIPTION SCHEME |
| } | | | |

FIG. 32

PARENTAL RATING DESCRIPTOR

| DATA STRUCTURE | NUMBER OF BITS | BIT STRING EXPRESSION | DESCRIPTION |
|---|---|---|---|
| Parental_rating_descriptor(){ | | | |
| descriptor_tag | 16 | uimsbf | DESCRIPTOR TAG |
| descriptor_length | 8 | uimsbf | DESCRIPTOR LENGTH |
| for(i=0;i<N;i++){ | | | |
| country_code | 24 | bslbf | COUNTRY CODE |
| rating | 8 | uimsbf | RATING: rating + 3 YEARS OLD INDICATES LOWER-LIMIT AGE |
| } | | | |

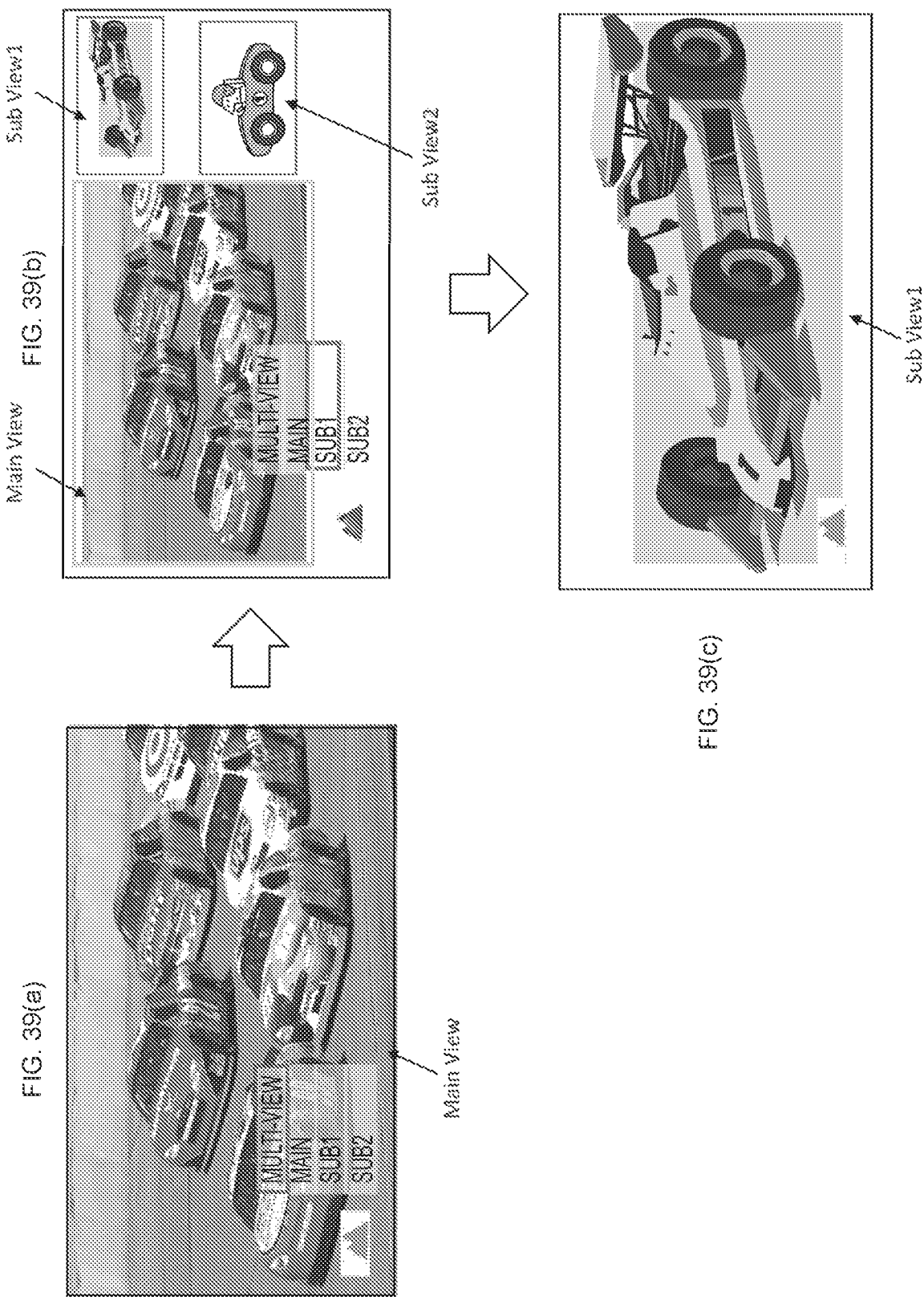

TRANSMISSION DEVICE, TRANSMISSION METHOD, RECEPTION DEVICE, AND RECEPTION METHOD

CROSS-REFERENCE TO RELATED APPLICATIONS

This application is a Continuation of U.S. application Ser. No. 15/527,404 filed May 17, 2017. U.S. application Ser. No. 15/527,404 is a National Stage of PCT Application No. PCT/JP2015/081523 filed Nov. 9, 2015, and claims priority of Japanese Patent application no. 2014-239386 filed Nov. 26, 2014, the entire contents of all of which are incorporated herein by reference.

TECHNICAL FIELD

The present technology relates to a transmission device, a transmission method, a reception device, and a reception method, and more specifically, relates to a transmission device and the like suitable for application to a broadcast and communication hybrid system.

BACKGROUND ART

In a current broadcasting system, an Moving Picture Experts Group-2 Transport Stream (MPEG-2 TS) scheme and an Real Time Protocol (RTP) scheme are broadly used as a media transport scheme (for example, see Patent Document 1). An MPEG Media Transport (MMT) scheme (for example, see Non-Patent Document 1) is discussed as a next-generation digital broadcasting scheme.

CITATION LIST

Patent Document

Patent Document 1: Japanese Patent Application Laid-Open No. 2013-153291

Non-Patent Document

Non-Patent Document 1: ISO/IEC DIS 23008-1:2013(E) Information technology-High efficiency coding and media delivery in heterogeneous environments-Part1: MPEG media transport (MMT)

SUMMARY OF THE INVENTION

Problems to be Solved by the Invention

An object of the present technology is to allow a reception side to easily select components in a broadcast and communication hybrid system, for example.

Solutions to Problems

A concept of the present technology lies in a transmission device including:

a transport stream generator that generates a transport stream in which a first transport packet including predetermined components and a second transport packet including signaling information related to the predetermined components are time-division multiplexed;

a transmission unit that transmits the transport stream via a predetermined transport path; and an information inserter that inserts component selection information to the second transport packet, wherein the component selection information includes information on a selective layer in which static selection is performed, information on a composite layer in which composition is performed, and information on an adaptive layer in which dynamic switching is performed, these layers being arranged in that order from top to bottom, information on each component selectable in the adaptive layer includes acquisition destination information, and the acquisition destination information of a component which is a target of adaptive switching among the components selectable in the adaptive layer is information that designates specific information location of a metafile having data stream acquisition information for adaptive streaming.

In the present technology, a transport stream generator generates a transport stream in which a first transport packet including predetermined components and a second transport packet including signaling information related to the predetermined components are time-division multiplexed. A transmission unit transmits the transport stream to a reception side via a predetermined transport path. For example, the predetermined transport path may be a broadcast transport path.

An information inserter inserts component selection information to the second transport packet. The component selection information includes information on a selective layer in which static selection is performed, information on a composite layer in which composition is performed, and information on an adaptive layer in which dynamic switching is performed, and these layers being arranged in that order from top to bottom. Moreover, information on each component selectable in an adaptive layer includes acquisition destination information, and the acquisition destination information of a component which is a target of adaptive switching among the components selectable in the adaptive layer is information that designates specific information location of a metafile having data stream acquisition information for adaptive streaming.

For example, the transport packet may be an MMT packet, and the component selection information may be included in an MPT. In this case, for example, the data stream for the adaptive streaming may be an MPEG-DASH-base data stream, the metafile may be an MPD file, and information that designates the specific information location of the metafile may be information that designates a specific adaptation set or a specific representation.

As described above, in the present technology, component selection information of three layers is inserted to the second transport packet. Moreover, the acquisition destination information of a target of adaptive switching among the components selectable in the adaptive layer is the information that designates the specific information location of the meta file having the data stream acquisition information for adaptive streaming. Due to this, it is possible to allow a reception side (particularly, the adaptive layer) to easily select components in a broadcast and communication hybrid system, for example.

Further, another concept of the present technology lies in a reception device including:

a reception unit that receives a transport stream in which a first transport packet including predetermined components and a second transport packet including signaling information related to the predetermined components are time-division multiplexed via a predetermined transport path, wherein component selection information is inserted to the second transport packet, the component selection information includes information on a selective layer in which static selection is performed, information on a composite layer in which composition is performed, and information on an adaptive layer in which dynamic switching is performed, these layers being arranged in that order from top to bottom, information on each component selectable in the adaptive layer includes acquisition destination information, and the acquisition destination information of a component which is a target of adaptive switching among the components selectable in the adaptive layer is information that designates specific information location of a metafile having data stream acquisition information for adaptive streaming, the reception device further including a component selector that selects components to be presented on the basis of the component selection information.

In the present technology, a reception unit receives a transport stream via a predetermined transport path. A first transport packet including predetermined components and a second transport packet including signaling information related to the predetermined components are time-division multiplexed in the transport stream. For example, the first transport path may be a broadcast transport path.

Component selection information is inserted to the second transport packet. The component selection information includes information on a selective layer in which static selection is performed, information on a composite layer in which composition is performed, and information on an adaptive layer in which dynamic switching is performed, and these layers being arranged in that order from top to bottom. Moreover, information on each component selectable in an adaptive layer includes acquisition destination information, and the acquisition destination information of a target of adaptive switching among the components selectable in the adaptive layer is information that designates specific information location of a metafile having data stream acquisition information for adaptive streaming.

A component selector selects a component that is to be presented on the basis of the component selection information. In this case, for example, switching of the target of adaptive switching is performed on the basis of the metafile.

For example, the transport packet may be an MMT packet, and selection information of the components may be included in an MPT. In this case, for example, the data stream for the adaptive streaming may be an MPEG-DASH-base data stream, the metafile may be an MPD file, and information that designates the specific information location of the metafile may be information that designates a specific adaptation set or a specific representation.

As described above, in the present technology, component selection information of three layers is inserted to the second transport packet. Moreover, the acquisition destination information of a target of adaptive switching among the components selectable in the adaptive layer is the information that designates the specific information location of the metafile having the data stream acquisition information for adaptive streaming. Due to this, it is possible to allow in a broadcast and communication hybrid system, for example (particularly, the adaptive layer), to easily select components.

It should be noted that, in the present technology, a metafile acquirer that acquires a metafile, for example, may be further included. In this case, for example, the metafile is acquired via either a broadcast transport path or a communication transport path. Moreover, in the present technology, the component selector may display a graphics user interface for selection on a screen when the component selection information has variations on a specific attribute to be selected by a user.

Effects of the Invention

According to the present technology, it is possible to allow a reception side to easily select components in a broadcast and communication hybrid system, for example. It should be noted that the advantageous effects described in the present specification are merely examples, and the advantageous effects of the present technology are not limited to them and may include additional effects.

BRIEF DESCRIPTION OF DRAWINGS

FIG. 2 is a diagram illustrating a stack model of a configuration example of MKT/broadcast signals.

FIGS. 3(a) to 3(e) are diagrams illustrating a configuration example of an MMT-scheme broadcast stream.

FIGS. 4(a) and 4(b) are diagrams illustrating a configuration example of an MMT packet and a configuration example of an MMTP payload.

FIGS. 9(a) to 9(e) are diagrams illustrating an example of the relation between structures arranged hierarchically in the MPD file.

FIG. 12 is a diagram illustrating description of major parameters of the PA message.

FIG. 13 is a diagram illustrating description of major parameters of the MP table.

FIG. 14 is a diagram illustrating a structure example (syntax) of the PA message.

FIG. 15 is a diagram illustrating a structure example (syntax) of the MP table (MPT).

FIG. 16 is a diagram illustrating a portion of a structure example (syntax) of "MMT_general_location_info( )".

FIG. 19 is a diagram for describing component selection information of an MPT and an MPD file.

FIGS. 20(a) and 20(b) are diagrams for describing designation of a specific information location of an MPD file as asset acquisition destination information.

FIG. 24 is a diagram illustrating a structure example of a view descriptor.

FIG. 25 is a diagram illustrating a structure example of a composite component type descriptor.

FIG. 26 is a diagram illustrating a structure example of an asset group descriptor.

FIG. 27 is a diagram illustrating a structure example of a dependency descriptor.

FIG. 28 is a diagram illustrating a structure example of a video component descriptor.

FIG. 29 is a diagram illustrating a structure example of an audio component descriptor.

FIG. 30 is a diagram illustrating a structure example of a target device descriptor.

FIG. 31 is a diagram illustrating a structure example of a target region descriptor.

FIG. 32 is a diagram illustrating a structure example of a parental rating descriptor.

FIGS. 39(a) to 39(c) are diagrams for describing an example of a change in view display in a reception terminal.

MODE FOR CARRYING OUT THE INVENTION

Figure 1:
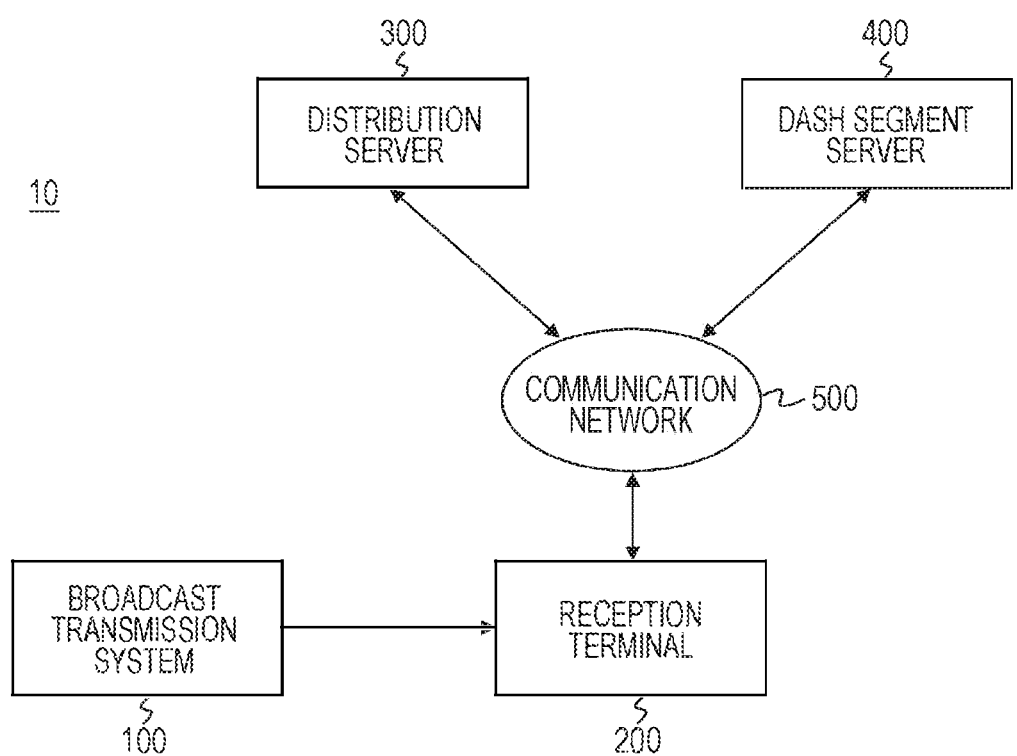
FIG. 1 is a block diagram illustrating a configuration example of a broadcast and communication hybrid system according to an embodiment.

Hereinafter, modes (hereinafter referred to as embodiments) for carrying out the present invention will be described. It should be noted that the description will be given in the following order:
1. Embodiment
2. Modified example 1. Embodiment Configuration Example of Broadcast and Communication Hybrid System FIG. 1 illustrates a configuration example of a broadcast and communication hybrid system 10. In the broadcast and communication hybrid system 10, a broadcast transmission system 100, a distribution server 300, and a DASH segment server 400 are disposed on a transmission side, and a reception terminal 200 is disposed on a reception side. The distribution server 300 and the DASH segment server 400 are connected to the reception terminal 200 via a communication network 500.

The broadcast transmission system 100 transmits an Internet protocol (IP)-scheme broadcast signal including components (assets) such as video, audio, caption, and the like as transport media. The distribution server 300 transmits a transport stream in which IP packets including components (assets) such as video, audio, and the like as transport media are successively arranged to the reception side via the communication network 500 in response to a request from the reception side.

The DASH segment server 400 transmits a stream segment (hereinafter referred to as a "DASH segment") of a dynamic adaptive streaming over HTTP (DASH) specification such as video, audio, and the like to the reception side via the communication network 500 according to a request from the reception side. That is, the DASH segment server 400 transmits an IP packet including a segment of a predetermined stream to a requester via the communication network 500 according to a request for the segment of the predetermined stream transmitted from the reception side.

The reception terminal 200 receives an IP-scheme broadcast signal transmitted from the broadcast transmission system 100 and receives a transport stream in which IP packets are successively arranged from the distribution server 300 or the DASH segment server 400. The reception terminal 200 acquires transport media (components) such as video, audio, and the like to be presented from signals received by such broadcast and communication hybrid transmission and presents images, audio, and the like.

FIG. 2 illustrates a stack model of a configuration example of MKT/broadcast signals associated with broadcasting from the broadcast transmission system 100. A type length value (TLV) transport packet is present in a lower layer. An IP packet is carried on the TLV transport packet. It should be noted that a TLV transport packet in which a transport control signal is carried as signaling information is also present.

A user datagram protocol (UDP) is carried on the IP packet. Moreover, an MPEG media transport (MMT) packet as a multiplexing transport packet is carried on the UDP. An MMT fragment unit (MFU) including coding data of components such as video, audio, caption, and the like or a signaling message including information on transport media is included in a payload portion of the MMT packet. It should be noted that an IP packet in which a network time protocol (NTP) packet including time information is carried on the UDP is also present in the IP packet.

FIGS. 3(a) to 3(e) illustrate a configuration example of an MMT-scheme broadcast stream. FIG. 3(a) illustrates a video elementary stream (Video ES). This video elementary stream is divided into a predetermined magnitude of clusters, and the divided cluster is disposed in the payload portion of the MFU as illustrated in FIG. 3(b).

As illustrated in FIG. 3(c), an MMT payload header is appended to the MFU to form an MMTP payload. Moreover, as illustrated in FIG. 3(d), an MMT header is further appended to the MMTP payload to form an MMT packet. Moreover, an MMT packet including a signaling message is also present in the payload portion. As illustrated in FIG. 3(e), a UDP header, an IP header, and a TLV header are appended to the MMT packet whereby a TLV packet that forms the MMT-scheme broadcast stream is generated.

It should be noted that although not illustrated in the drawings, TLV packets including MMT packets of the other components such as audio, caption, and the like are also present as the TLV packet. This MMT-scheme broadcast stream includes a first packet (the MMT packet) including the transport media (the components) and a second packet (the MMT packet) including the signaling information.

FIG. 4(a) illustrates a configuration example of an MMT packet. The MMT packet includes an MMT packet header (MMTP header) and an MMTP payload. The 2-bit field "V" indicates the version of an MMT protocol. When the version follows the first edition of MMT standards, "00" is set to this field. The 1-bit field "C" indicates packet counter flag (packet_counter_flag) information, and "1" is set to this field when the packet counter flag is present. The 2-bit field "FEC" indicates an FEC type (FEC_type).

The 1-bit field "X" indicates extension header flag (extension_flag) information, and "1" is set to this field when extension of the header of the MMT packet is performed. In this case, a "header_extension" field to be described later is present. The 1-bit field "R" indicates RAP flag (RAP_flag) information, and "1" is set to this field when the MMT payload transported by the MMT packet includes the start of a random access point.

The 6-bit field "type" is a payload type (payload_type) information and indicates a data type of the MMTP payload. For example, "0x00" indicates that the payload is media processing unit (MPU) and "0x02" indicates that the payload is a signaling message.

The 16-bit field "packet_id" indicates a packet identifier (packet_id) for identifying a data type of the payload. The 32-bit field "timestamp" indicates a timestamp for transport (that is, the time when an MMT packet is output from the transmission side). This time is represented in an NTP short format. The 32-bit field "packet_sequence_number" indicates a sequence number of MMT packets having the same packet identifier (packet_id). The 32-bit field "packet_ counter" indicates the order of an MMT packet in the same IP data flow regardless of the value of the packet identifier (packet_id).

When the 1-bit flag information "X" is "1," a field "header_extension" which is an MMT extension header is disposed behind the 32-bit field "packet_counter". After that, a field "payload data" and a field "source_FEC_payload_ID" which form the MMTP payload are present.

FIG. 4(b) illustrates a configuration example (syntax) of an MMTP payload disposed in the field "payload data" of the above-described MMT packet. It should be noted that this example illustrates a case of an MPU mode in which "type" of the MMT header is "0x00". First, header information is present. The 16-bit field "length" indicates an entire byte size of the MMTP payload. The 4-bit field "FT" indicates a field type. "0" indicates that "MPU metadata" is included, "1" indicates that "Movie Fragment metadata" is included, and "2" indicates that "MFU" is included.

Here, the MMT fragment units (MFUs) are obtained when an MPU is subdivided (that is, fragmented). For example, in the case of video, it may be set such that this MFU corresponds to one NAL unit. Moreover, for example, when a communication network transport path is used for transmission, the MFU may include one or a plurality of MTU sizes.

Moreover, the MPU starts with a random access point (RAP) and includes one or a plurality of access units (AUs). Specifically, for example, one group of pictures (GOP) may form one MPU. This MPU is defined for each asset (component). Therefore, a video MPU including video data only is created from a video asset and an audio MPU including audio data only is created from an audio asset.

The 1-bit flag information "T" indicates whether timed media is transported or non-timed media is transported. "1" indicates timed media and "0" indicates non-timed media.

The 2-bit field "f_i" indicates whether an integer number of data units (DUs), the first, the middle, or the last fragment obtained by fragmenting the data unit is inserted in the field "DU payload". "0" indicates that an integer number of data units are inserted, "1" indicates that the first fragment is inserted, "2" indicates that the middle fragment is inserted, and "3" indicates that the last fragment is inserted.

The 1-bit flag information "A" indicates whether a plurality of data units is inserted in the field "DU payload". "1" indicates that the data units are inserted and "0" indicates that the data units are not inserted. The 8-bit field "frag_counter" indicates the order of the fragment when "f_i" is 1 to 3.

The 32-bit field "MPU_sequence_number" is a number indicating the order of the MPU and is information for identifying the MPU. For example, when one GOP forms one MPU, if "MPU_sequence_number" of a certain GOP is "i," the "MPU_sequence_number" of the next GOP is "i+1".

The fields "DU_length," "DU_header," and "DU_payload" are disposed behind the field "MPU_sequence_number". The 16-bit field "DU_length" is not present when "A=0" (that is, when a plurality of data units are not inserted in the field "DU payload"). Moreover, the field "DU header" is not present when "FT=0/1" (that is, when "MPU_metadata" or "Movie Fragment metadata" is included).

Figure 5:
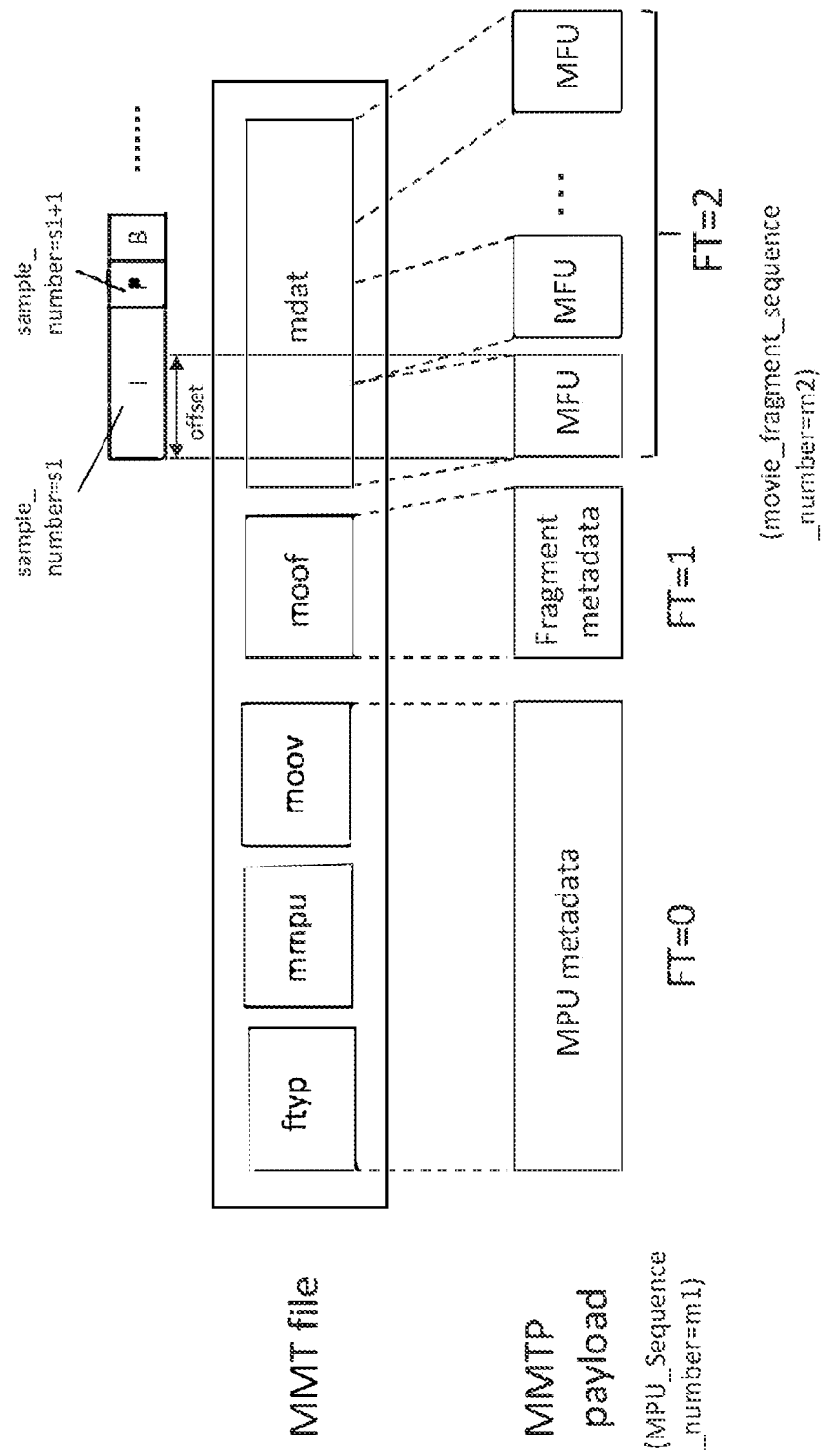
FIG. 5 is a diagram illustrating an example of correlation between an MMT file and an MMTP payload when sending video data of one GOP.

In the MMT scheme, transport media such as video is transported in a contents format based on a fragmented ISO base media file format (ISOBMFF). FIG. 5 illustrates an example of the correlation between an MMT file and an MMTP payload when video data of one GOP is transmitted.

The configuration of the MMT file is basically equivalent to the file configuration of MP4. First, a box "ftyp" appears. Subsequently, a box "mmpu" which is unique to MMT appears. Subsequently, a box "moov" as metadata of the entire file appears. Subsequently, a movie fragment appears. This movie fragment includes a box "moof" in which control information is inserted and a box "mdat" in which coded video data is inserted. In this example, since it is assumed that one GOP forms one MPU, only one pair of movie fragments is present.

The metadata of the respective boxes "ftyp," "mmpu," and "moov" are transported by one MMT packet as "MPU metadata". In this case, "FT=0". The metadata of the box "moof" is transported by one MMT packet as "Movie Fragment metadata". In this case, "FT=1". The coded video data included in the box "mdat" is fragmented into "MFUs" and the respective MFUs are transported by one MMT packet. In this case, "FT=2".

Figure 6:
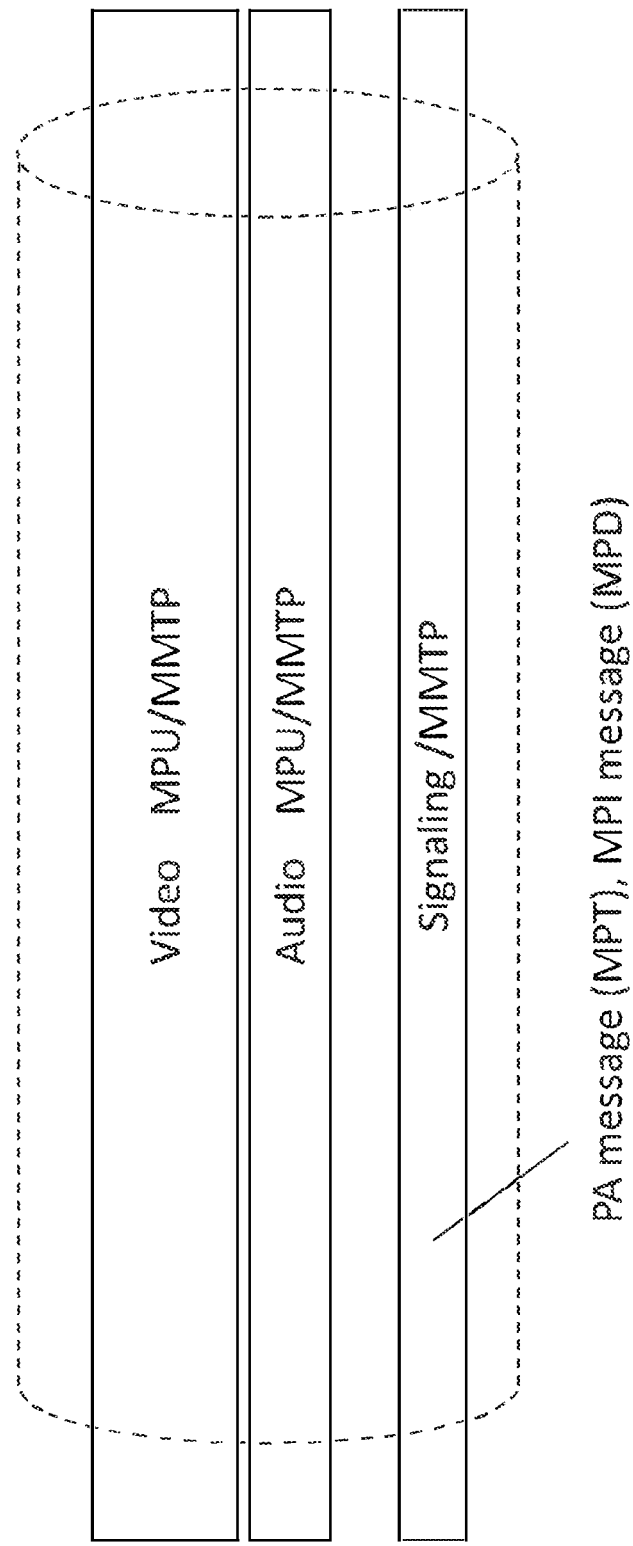
FIG. 6 is a diagram illustrating an image of broadcast signals of one channel (broadcast program) transmitted from a broadcast transmission system to a reception terminal.

FIG. 6 illustrates an example of an image of a broadcast signal associated with one channel (one broadcast program) transmitted from the broadcast transmission system 100 to the reception terminal 200. This broadcast signal includes an MMT packet of video, audio, and the like and also includes an MMT packet including a signaling message. Examples of the signaling message include a PA message, an MPI message, and the like.

The PA message includes various tables such as an MP table (MPT). The MPI message includes a media presentation description (MPD) file itself or a uniform resource locator (URL) or the like as acquisition destination information for acquiring the MPD file. Metadata that manages components (assets) such as video, audio, and the like distributed from the DASH segment server 400 is described in the MPD file. The MPD file forms a metafile having data stream acquisition information for adaptive streaming.

In the MPD format, the attributes of each of the streams of video, audio, and the like are described using an element called a representation. For example, representations are classified for a plurality of video data streams having different rates and the rates of the respective representations are described in the MPD file. On the reception side, it is possible to select an optimal stream according to a network environment state by referring to the rate value.

Figure 7:
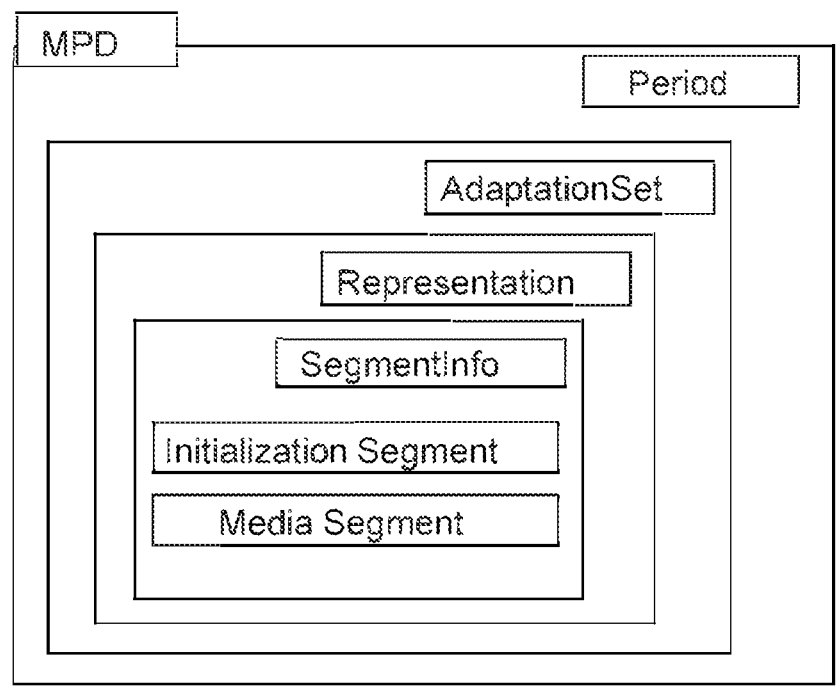
FIG. 7 is a diagram illustrating a hierarchical structure of an MPD file.

As illustrated in FIG. 7, the MPD file has a hierarchical structure. Items of information such as a compression scheme, a coding rate, an image size, and language of moving pictures stored in the DASH segment server 400 are hierarchically described in the MPD file in XML format. Structures such as period, adaptation set (AdaptationSet), representation, segment information (SegmentInfo), initialization segment, and media segment are hierarchically included in the MPD file.

The period structure has information on a program (one pair of items of synchronized data of video, audio, and the like). Moreover, the adaptation set structure included in the period structure groups a stream selection range (a representation group). Moreover, the representation structure included in the adaptation set structure includes information such as a coding rate of video or audio, an image size of video, and the like.

Moreover, the segment information structure included in the representation structure includes information related to a video or audio segment. Moreover, the initialization segment structure included in the segment information structure includes initialization information such as a data compression scheme. Furthermore, the media segment structure included in the segment information structure includes information on an address or the like for acquiring a video or audio segment.

Figure 8:
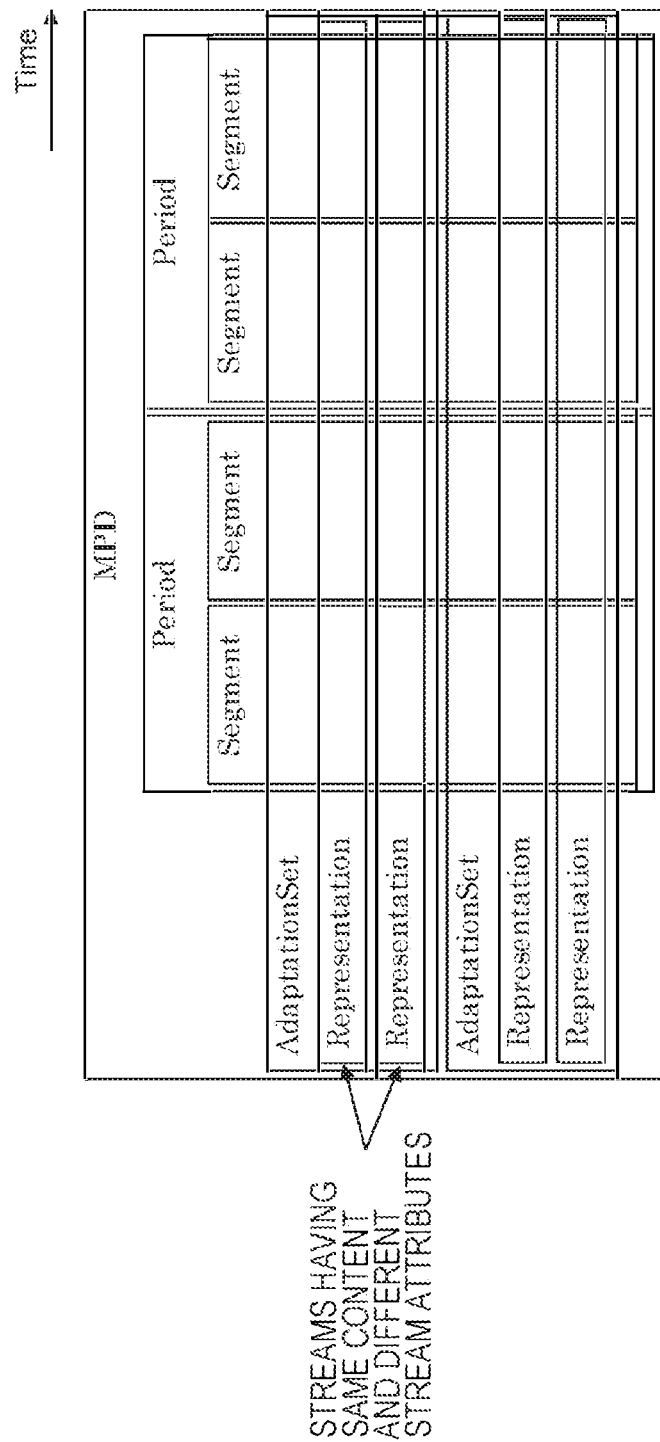
FIG. 8 is a diagram illustrating examples of structures included in the MPD file, which are arranged on a time axis.

FIG. 8 illustrates examples of structures included in the MPD file, which are arranged on a time axis. In this example, two periods are included in the MPD file, and two segments are included in each period. Moreover, in this example, two adaptation sets are included in each period, and two representations associated with streams having different stream attributes and the same content are included in each adaptation set.

FIGS. 9(a) to 9(e) illustrate an example of the relation between structures arranged hierarchically in the MPD file. As illustrated in FIG. 9(a), a media presentation which represents the entire MPD file includes a plurality of periods divided into time intervals. For example, the first period starts at 0 second, the next period starts at 100 seconds, and so on.

As illustrated in FIG. 9(b), the period includes a plurality of adaptation sets (AdaptationSets). Each adaptation set depends on a difference in media type such as video, audio, or the like, a difference in language even if the adaptation sets have the same media type, and a difference in viewpoint. As illustrated in FIG. 9(c), the adaptation set includes a plurality of representations. Each representation depends on a difference in stream attribute (for example, rate).

As illustrated in FIG. 9(d), segment information (SegmentInfo) is included in the representation. As illustrated in FIG. 9(e), the segment information includes an initialization segment and a plurality of media segments in which information on each segment obtained by further subdividing the period is described. The media segment includes information on a URL for actually acquiring segment data of video, audio, or the like.

It should be noted that streams can be freely switched between a plurality of representations included in the adaptation set. In this way, it is possible to select a stream of an optimal rate according to the network environment state on the reception side and to distribute seamless video.

Figure 10:
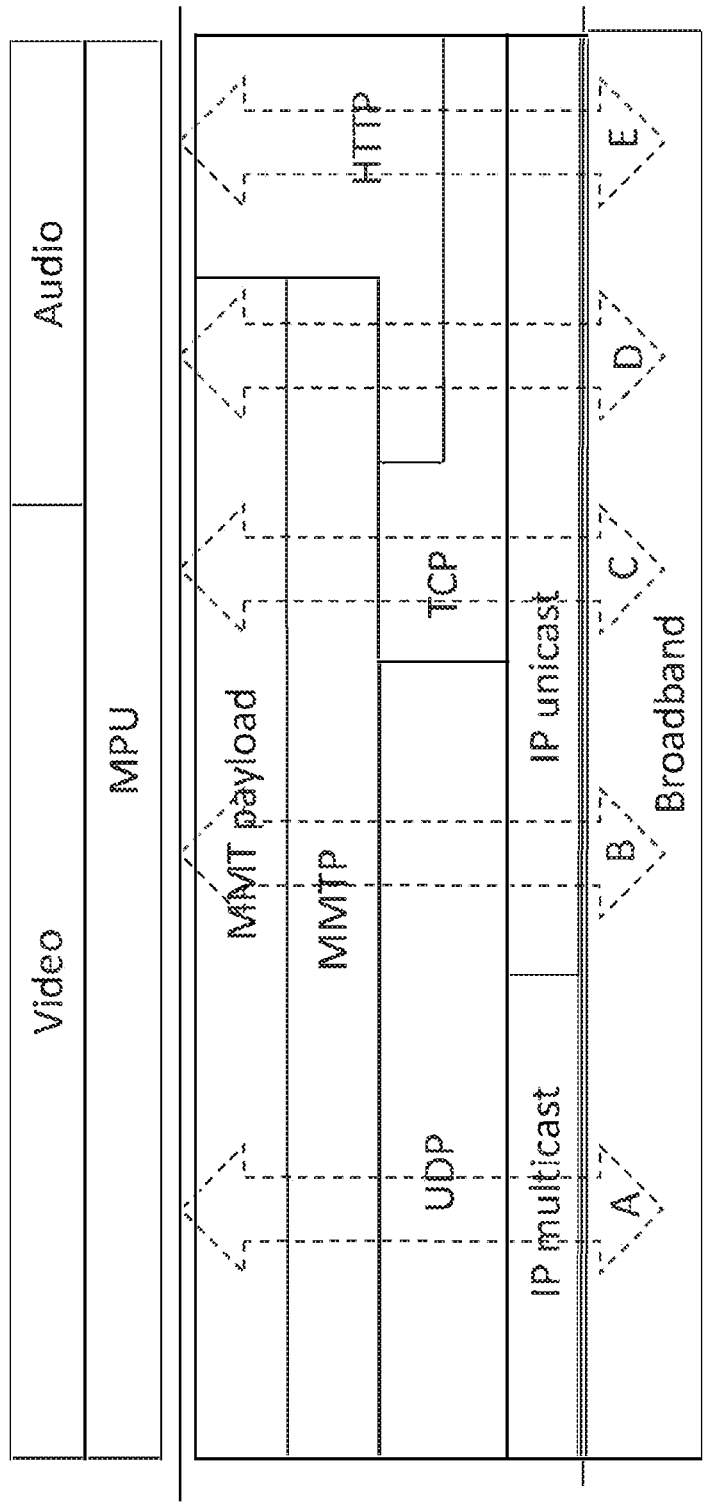
FIG. 10 is a diagram illustrating a stack model of a configuration example of MMT/communication signals.

FIG. 10 illustrates a stack model of a configuration example of MMT/communication signals associated with distribution from the distribution server 300. (A) multicast distribution, (B) MMTP/UDP distribution, (C) MMTP/TCP distribution, (D) MMTP/HTTP distribution, and (E) MPU/HTTP distribution may be considered as MMT/communication distribution options.

(A) Multicast Distribution

In the case of multicast distribution, an IP packet is present on the lower layer. A user datagram protocol (UDP) is carried on this IP packet. An MPEG media transport (MMT) packet is then carried on the UDP. An MPU including coded data of components such as video, audio, and the like is included in the payload portion of the MMT packet.

This multicast distribution is the most preferable scheme when a congestion problem is taken into consideration when the multicast distribution is used for a broadcast and communication hybrid. Moreover, since the multicast distribution uses UDP transport, satisfactory transport efficiency is obtained. However, since the multicast distribution has a packet loss problem, it may be necessary to perform application layer-forward error correction (AL-FEC).

Moreover, in the case of the multicast distribution, only a reception terminal which is directly connected to a managed network can be used. Moreover, in the case of the multicast distribution, there may be a case in which a multicast IP stream transports an MMTP stream in which a plurality of assets (components) are multiplexed and a case in which the multicast IP stream transports an MMTP stream including a single asset.

(B) MMTP/UDP Distribution

In the case of MMTP/UDP distribution, an IP packet is present on the lower layer. A user datagram protocol (UDP) is carried on this IP packet. An MMT packet is then carried on the UDP. An MPU including coded data of components such as video, audio, and the like is included in the payload portion of the MMT packet.

Since the MMTP/UDP distribution uses unicast, the MMTP/UDP distribution has a congestion problem when the MMTP/UDP distribution is used for a broadcast and communication hybrid. Moreover, since the MMTP/UDP distribution uses UDP transport, satisfactory transport efficiency is obtained. However, it may be necessary to perform AL-FEC. Furthermore, the multicast distribution is better than TCP in terms of total delay and synchronization.

Moreover, since the MMTP/UDP distribution uses unicast, although the MMTP/UDP distribution can be widely used in general Internet connection apparatuses, the MMTP/UDP distribution may not be used as a default distribution protocol depending on a router setting. In the case of the MMTP/UDP distribution, there may be a case in which an IP stream transports an MMTP stream in which a plurality of assets (components) are multiplexed and a case in which the IP stream transports an MMTP stream including a single asset.

(C) MMTP/TCP Distribution

In the case of MMTP/TCP distribution, an IP packet is present on the lower layer. A transmission control protocol (TCP) is carried on this IP packet. Moreover, an MMT packet is carried on the TCP. An MPU including coded data of components such as video, audio, and the like is included in the payload portion of the MMT packet.

Since the MMTP/TCP distribution uses unicast, the MMTP/TCP distribution may be widely used in general Internet connection apparatuses. Moreover, since the MMTP/TCP distribution uses unicast, the MMTP/TCP distribution has a congestion problem when the MMTP/TCP distribution is used for a broadcast and communication hybrid. Furthermore, since the MMTP/TCP distribution uses TCP transport, although the efficiency is sacrificed, since retransmission is possible, AL-FEC is not necessary.

Moreover, in the case of the MMTP/TCP distribution, there may be a case in which an IP stream transports an MMTP stream in which a plurality of assets (components) are multiplexed and a case in which the IP stream transports an MMTP stream including a single asset.

(D) MMTP/HTTP Distribution

In the case of MMTP/HTTP distribution, an IP packet is present on the lower layer. A TCP is carried on this IP packet. Moreover, a hyper text transfer protocol (HTTP) is carried on the TCP, and an MMT packet is carried thereon. An MPU including coded data of components such as video, audio, and the like is included in the payload portion of the MMT packet.

Since the MMTP/HTTP distribution uses HTTP, the MMTP/HTTP distribution can be widely used in general Internet connection apparatuses. Moreover, since the MMTP/HTTP distribution uses unicast, the MMTP/HTTP distribution has a congestion problem when the MMTP/HTTP distribution is used for a broadcast and communication hybrid. Furthermore, since the MMTP/HTTP distribution uses TCP transport, although the efficiency is sacrificed, since retransmission is possible, AL-FEC is not necessary.

Moreover, in the case of the MMTP/HTTP distribution, there may be a case in which an IP stream transports an MMTP stream in which a plurality of assets (components) are multiplexed and a case in which the IP stream transports an MMTP stream including a single asset.

(E) MPU/HTTP Distribution

In the case of MPU/HTTP distribution, an IP packet is present on the lower layer. A TCP is carried on this IP packet. Moreover, HTTP is carried on the TCP, and an MPU including coded data of components such as video, audio, and the like is included in the payload portion of the HTTP packet.

Since the MPU/HTTP distribution uses HTTP, the MPU/HTTP distribution can be widely used in general Internet connection apparatuses. Moreover, since the MPU/HTTP distribution uses unicast, the MPU/HTTP distribution has a congestion problem when the MPU/HTTP distribution is used for a broadcast and communication hybrid. Furthermore, since the MPU/HTTP distribution uses TCP transport, although the efficiency is sacrificed, since retransmission is possible, AL-FEC is not necessary.

Moreover, since the MPU/HTTP distribution does not use the MMT packet, although the MPU/HTTP distribution provides better transport efficiency than the MMTP/HTTP distribution, there is a problem that information such as an MMTP header is lost. Furthermore, in the case of the MPU/HTTP distribution, the reception terminal acquires individual MPU files of a single asset (component) according to HTTP.

Figure 11:
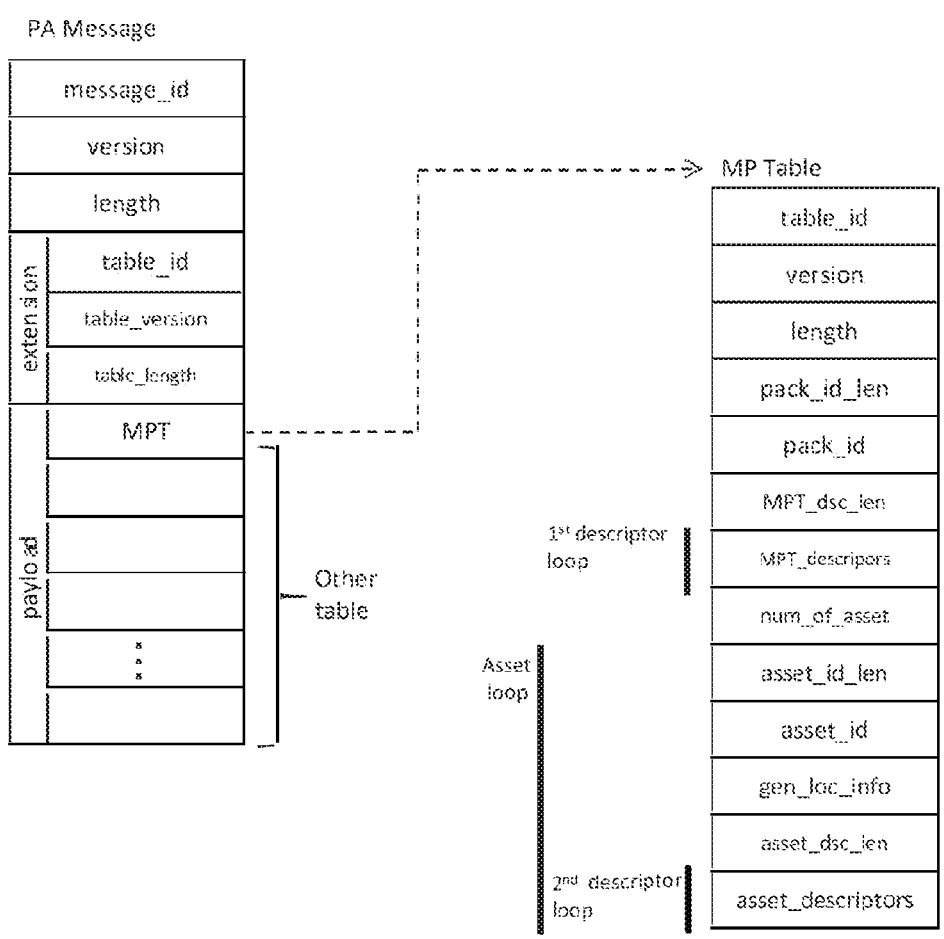
FIG. 11 is a diagram schematically illustrating a configuration example of a package access (PA) message and an MMT package table (MP table (MPT)).

FIG. 11 schematically illustrates the structure of a package access (PA) message and an MNT package (MP) table (MPT). Moreover, FIG. 12 illustrates the description of major parameters of the PA message and FIG. 13 illustrates the description of major parameters of the MP table.

The "message_id" is a fixed value for identifying a PA message in various items of signaling information. The "version" is an 8-bit integer value indicating the version of a PA message. For example, even when only a portion of the parameters that form the MP table is updated, the integer value is incremented by +1. The "length" is the number of bytes indicating the size of the PA message, which is counted immediately after this field.

Index information of tables disposed in the payload field is disposed in the field "extension". A number of fields "table_id," "table_version," and "table_length" corresponding to the number of tables are arranged in this field. The "table_id" is a fixed value for identifying a table. The "table_version" indicates the version of a table. The "table_length" is the number of bytes indicating the size of a table.

A MP table (MPT) and a predetermined number of other tables are arranged in the payload field of the PA message. Hereinafter, the configuration of the MP table will be described.

The "table_id" is a fixed value for identifying an MP table in various items of signaling information. The "version" is an 8-bit integer value indicating the version of the MP table. For example, even when only a portion of the parameters that form the MP table is updated, the integer value is incremented by +1. The "length" is the number of bytes indicating the size of the MP table, which is counted immediately after this field.

The "pack_id" is identification information of an entire package that is made up of all assets (components) transported by broadcasting and communication. This identification information is text information. The "pack_id_len" indicates the size (the number of bytes) of the text information. The field "MPT_descripors" is a storage area of descriptors associated with the entire package. The "MPT_dsc_len" indicates the size (the number of bytes) of the field.

The "num_of_asset" indicates the number of assets (components) as elements that form the package. A number of following asset loops corresponding to this number are disposed. The "asset_id" is information (asset ID) for uniquely identifying an asset. This identification information is text information. The "asset_id_len" indicates the size (the number of bytes) of the text information. The "gen_loc_info" is information indicating the location of an acquisition destination of an asset. The field "asset_descriptors" is a storage area of descriptors associated with the asset. The "asset_dsc_len" indicates the size (the number of bytes) of the field.

It should be noted that FIG. 14 indicates a structure example (syntax) of the above-described PA message. Moreover, FIG. 15 illustrates a structure example (syntax) of the above-described MP table (MPT). The field "gen_loc_info" in FIG. 11 corresponds to the field "asset_location" in FIG. 15, and a plurality of items of "MMT_general_location_info( )" can be disposed as information indicating the location of the acquisition destination of the asset. Moreover, the field "asset_descriptors" in FIG. 11 corresponds to the field "asset_descriptors" in FIG. 15.

FIG. 16 illustrates a portion of a structure example (syntax) of "MMT_general_location_info ( )". The 8-bit field "location_type" indicates the type of information (hereinafter appropriately referred to as "location information") indicating the location of the acquisition destination of the asset. When an asset is transmitted by broadcasting, the "location_type" is set to "0x00," and a packet identifier (packt_id) is inserted as the location information.

Moreover, when an asset is distributed by the protocol of (A) multicast distribution, the "location_type" is set to "0x01" or "0x02," and a source address (ipv4_src_addr, ipv6_src_addr), a destination address (ipv4_dst_addr, ipv6_dst_addr), a destination port number (dst_port), and a packet identifier (packt_id) are inserted as the location information. In this case, it is identified by the "location_type" that the distribution is multicast distribution.

Moreover, when an asset is distributed by the protocol of (B) MMTP/UDP distribution, (C) MMTP/TCP distribution, (D) MMTP/HTTP distribution, or (E) MPU/HTTP distribution, the "location_type" is set to "0x05" and a uniform resource locator (URL) is disposed as the location information.

Figure 17:
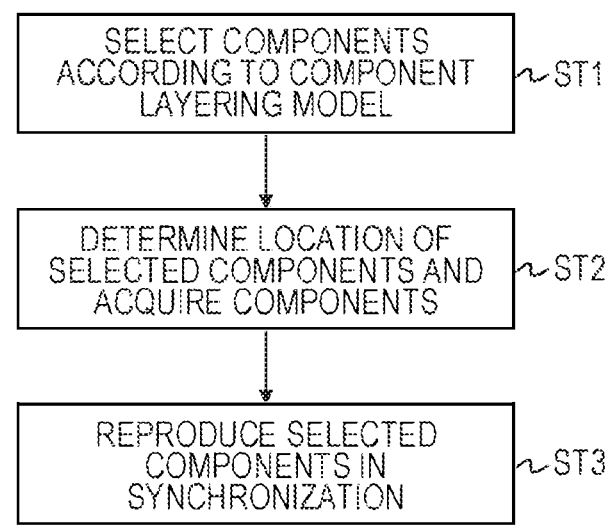
FIG. 17 is a diagram illustrating a process flow of hybrid distribution in a reception terminal.

FIG. 17 illustrates a process flow of the reception terminal 200 (that is, a process flow of hybrid distribution). In step ST1, the reception terminal 200 selects components to be presented according to a component layering model. In this case, the reception terminal 200 selects a component on the basis of component selection information (component layering model) inserted in the MPT.

Subsequently, in step ST2, the reception terminal 200 determines the location of the selected component and acquires the component. In this case, the reception terminal 200 acquires the component on the basis of the acquisition destination information of the component inserted as the signaling information. Moreover, in step ST3, the reception terminal 200 reproduces the selected component in a synchronized manner.

Figure 18:
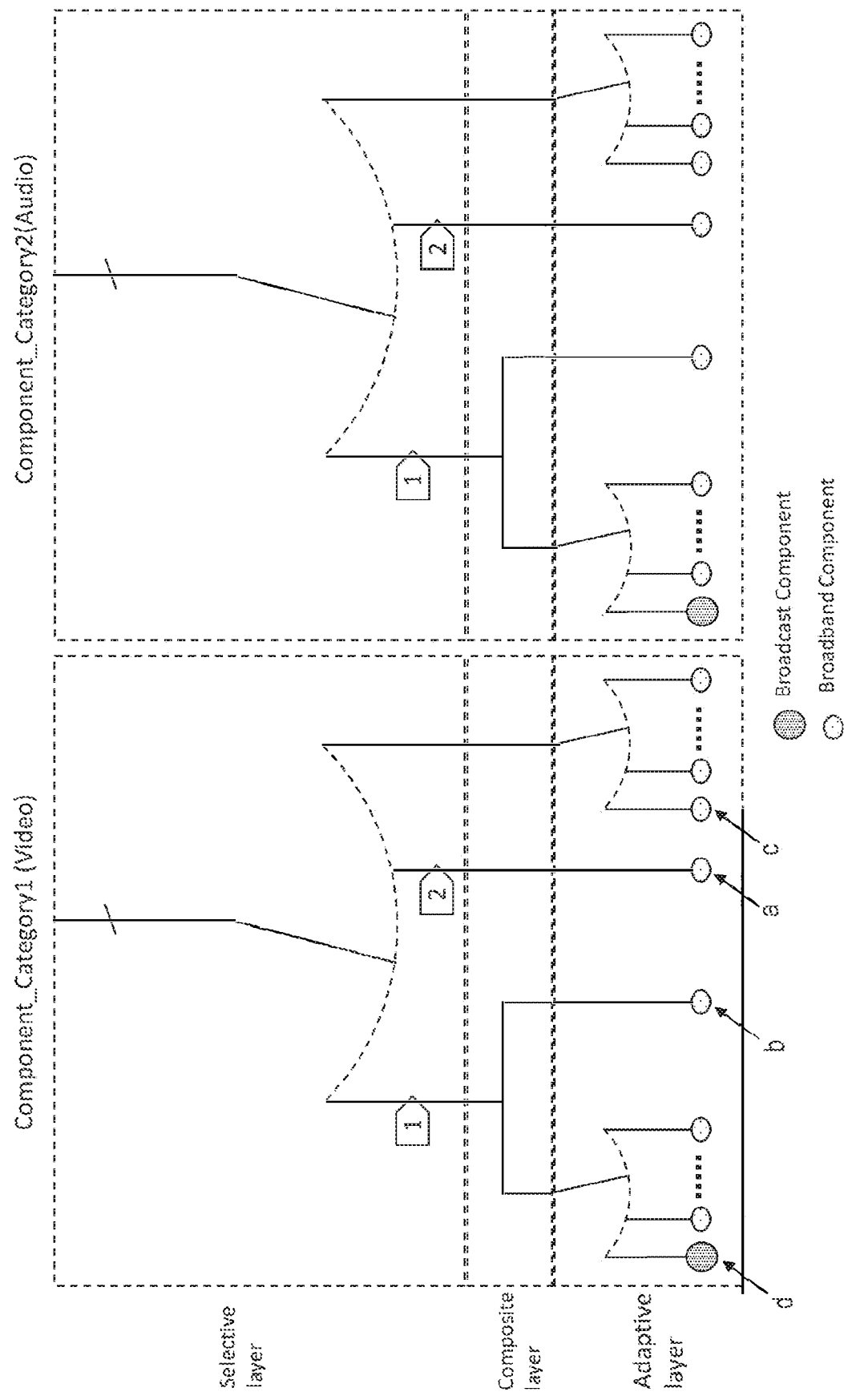
FIG. 18 is a diagram illustrating an example of a component layering model.

The component layering model will be described. FIG. 18 illustrates an example of the component layering model. The component layering model is a model for selecting components from the three layer structures, that is, adaptive layer, composite layer, and selective layer.

The adaptive layer is a layer positioned at the lowermost position and is a layer in which components are adaptively switched. The composite layer is a layer positioned at the center and is a layer in which signal composition is performed to obtain another signal. The selective layer is a layer positioned at the uppermost position and is a layer in which components to be presented finally are selected. The respective layers will be described further.

The selective layer is a layer in which a component is statically selected by a user or is automatically selected by a terminal from a plurality of component choices in each component category. Here, the component category means the units for selecting video or audio. In the illustrated example, two categories of video and audio are illustrated.

In the selective layer, the following usages are assumed, for example.

(1) A component is selected automatically by a terminal or is selected by a user on a graphical user interface (GUI) for selection on the basis of an attribute.

(2) When there is only one component choice, the one component is selected.

(3) There may be a case in which a combination of different component categories is selected.

(4) When a plurality of components is selected, video and caption (subtitle) are displayed on a plurality of screens and audio is output in a mixed manner.

The following at tributes, for example, are used in this selective layer.

(1) Combination tag: An identifier (ID) of a combination of different component categories that form one view. When this combination tag is present, selection is made across categories.

(2) Language: Language is indicated by a language code.

(3) Video parameter: A video parameter includes a resolution, a frame rate, 3D information, and the like.

(4) Audio parameter: An audio parameter includes a multi-channel mode, a sampling rate, and the like.

(5) Target region: A target region is indicated by a region code.

(6) Target device: A target device is indicated by a device type.

(7) View title: A view title is a title for selecting views.

(9) Object: An object is a narration and the like, for example.

The composite layer is a layer in which a plurality of components in each component category are combined so as to function as one component. The fact that the selective layer is present above the composite layer means that the composite signal is regarded as one signal and is selected in the selective layer.

In the composite layer, the following usages are assumed, for example.

(1) Composition is performed on the basis of an attribute indicating the type of composition and an attribute value indicating the positioning of composition.

(2) When there is only one component, a composition operation is not necessary.

In the composite layer, the following composition type and the composition positioning information are used as attributes, for example. It should be noted that the following example illustrates two cases in which positioning is "positioning 1" and "positioning 2".

(1) A composition type is scalable, and composition positioning information is Base and Extended. For example, although display of HD resolution is possible in Base, display of 4K resolution is possible in both Base and Extended.

(2) A composition type is 3D, and composition positioning information is Left and Right.

(3) A composition type is Tile, and composition positioning information is the image tiling position of "TileA1" and "TileA2". Here, Tile means arranging images horizontally or vertically to obtain a wide-view image.

(4) A composition type is Layer, and composition positioning information is the order from the deep side, of superimposition of "Layer1" and "Layer2". Here, Layer means superimposing images from the deep side sequentially.

(5) A composition type is mixing, and composition positioning information is Track1, Track2.

The adaptive layer is a layer in which a plurality of components in each component category is dynamically switched on the basis of adaptive determination of a terminal so as to function as one component.

In the adaptive layer, the following usages are assumed, for example.

(1) A terminal automatically selects and switches an optimal component every predetermined period (for example, 10 seconds) as so-called adaptive streaming.

(2) When there is only one switching target component, an adaptive switching operation is not necessary and the component is always selected.

(3) When there are components based on a communication path, a component having an appropriate bit rate is selected according to an occupancy state of a reception buffer of a terminal, which changes according to a congestion state of the communication path.

(4) When components based on a broadcast path are included, selection of communication components is determined on the basis of the bit rate.

(5) As a case in which a plurality of components of a broadcast path is present, it is thought that there is a case in which a component transported by high-quality normal robustness signals is selected on the basis of physical reception signal intensity (robustness) when the weather is good and a component transported by low-quality high robustness signals is selected when the weather is poor.

The following attributes, for example, are used in this adaptive layer.

(1) Path: A path is a broadcast path, a communication path, and the like.

(2) Bit rate (3) Robustness indicator: Normal robustness, high robustness, and the like.

(4) Video parameter: A video parameter is a resolution, a frame rate, and the like.

(5) Audio parameter: An audio parameter is a multichannel mode, a sampling rate, and the like.

The component layering model illustrated in FIG. 18 illustrates component selection information in the categories of video and audio. In the selective layer, one or a plurality of components can be selected in each category. Here, components which are combined by a combination tag are present between two categories and the components are selected across categories.

In the composite layer, respective components composition process which is a choice in the selective layer is illustrated. When there is only one composition target component, the component is a choice in the selective layer as it is. In the adaptive layer, an adaptive switching process of respective components used in the composite layer is illustrated. When there is only one switching target component, the component is always selected.

As described above, the reception terminal 200 selects components on the basis of the component selection information (component layering model) inserted as the signaling information. An example of a component selection operation of the reception terminal 200 will be described.

(1) The reception terminal 200 acquires component selection information and selects components from the choices by taking the number of components to be selected first into consideration. In this case, when components are selected by a user, a selection GUI is displayed on the basis of attribute information of respective components of the selective layer which is the uppermost layer and the user is allowed to select components.

When components are automatically selected by a terminal, the reception terminal 200 selects components on the basis of the attribute information of the respective components of the selective layer which is the uppermost layer and personal information and terminal capability information of the reception terminal 200. Although the above-described process is basically performed for each component category, when an asset group is set, components are selected across categories.

(2) When a plurality of elements is present in the component selected in the selective layer, the reception terminal 200 presents components for composition using a plurality of components which is adaptively switched in the adaptive layer in which designated component composition is to be performed.

(3) When only one element is present in the component selected in the selective layer, the reception terminal 200 presents components using the components which are adaptively switched in the adaptive layer.

(4) When there is only one switching target component of the adaptive layer in (2) and (3), the reception terminal 200 does not perform switching and presents the component.

Component Selection Information

In this embodiment, the component selection information is inserted in the MPT table (MPT) which is included in the PA message. The PMT includes information of respective assets (components) such as video, audio, caption, and the like, which are used as component selection information. The information of the respective assets includes various descriptors.

For example, the descriptor used as the component selection information includes a view descriptor, a composite component type descriptor, an asset group descriptor, a dependency descriptor, a video component descriptor, an audio component descriptor, a target device descriptor, a target region descriptor, a parental rating descriptor, and the like. The details of these descriptors will be described later.

As illustrated in FIG. 19, the reception terminal 200 selects components in the selective layer, the composite layer, and the adaptive layer on the basis of the information of the respective assets (components) present in the MPT. However, the reception terminal 200 selects components which are targets of adaptive switching in the adaptive layer on the basis of the information of the MPD file.

Due to this, the information location of a specific representation or a specific adaptation set of the NPD file is designated in the MPT as an acquisition destination of a component which are targets of adaptive switching. In this case, as illustrated in FIG. 19, a representation or an adaptation set of the MPD file is positioned as an asset of the MPT.

In this embodiment, a value (for example, "0x0D") indicating "MPEG-DASH segment" is newly defined as "Location_type". When the information location of a specific representation of the MPD file is used as the acquisition destination (Method1), a period ID (period_id), an adaptation set ID (adaptationSet_ID), and a representation ID (representation_ID) are inserted as the location information as illustrated in FIG. 20(a).

Moreover, when the information location of a specific adaptation set of the MPD file is used as the acquisition destination (Method 2), a period ID (period_id) and an adaptation set ID (adaptationSet_ID) are inserted as the location information as illustrated in FIG. 20(b). Moreover, in this case, a period ID (period_id), an adaptation set ID (adaptationSet_ID), and a representation ID (representation_ID) may be inserted as the location information as illustrated in FIG. 20(a). In this case, the representation ID is set to "all 0" or "all 1," and it may be understood that the location information is designated by the adaptation set ID only.

Figure 21:
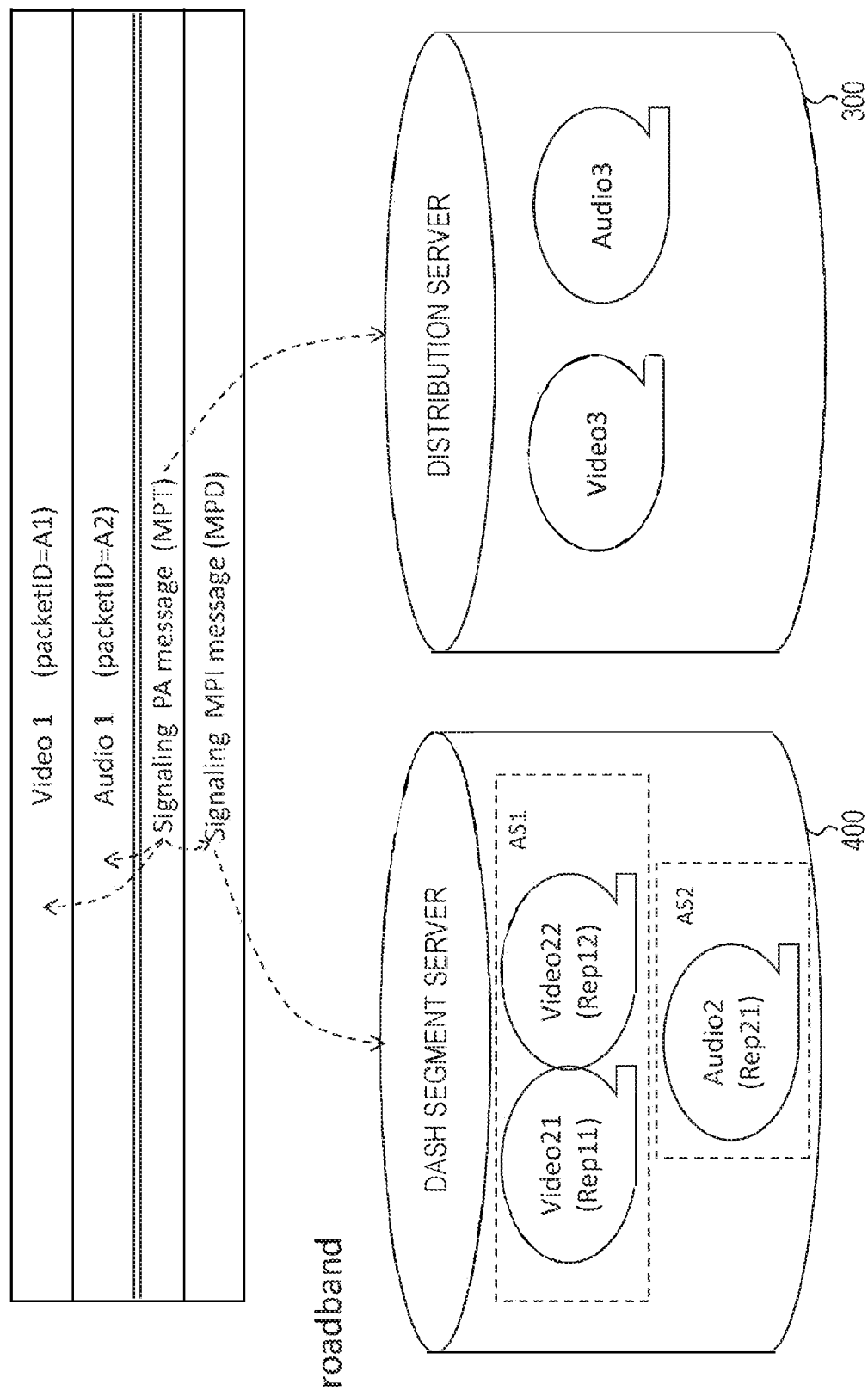
FIG. 21 is a diagram illustrating an example of a signal configuration used in a broadcast and communication hybrid system.

FIG. 21 illustrates an example of a signal configuration used in the broadcast and communication hybrid system 10 illustrated in FIG. 1. In broadcasting (Broadcast), video 1 (Video1) and audio 1 (Audio1) are transported using an MMT packet and signaling (Signaling) is transported. As this signaling, a PA message including MPT is present and an MPI message including the MPD file or the URL as the acquisition destination information of the MPD file is present.

Moreover, in communication, video 21 (Video21), video 22 (Video22), and audio 2 (Audio2) can be distributed from the DSAH segment server 400. The video 21 (Video21) and the video 22 (Video22) are the targets of adaptive switching. The information location of the specific representation or the specific adaptation set of the MPD file is designated by the corresponding asset of the MPT as the acquisition destinations of these videos. The actual acquisition destination information of these videos is included in the MPD file.

Moreover, in communication, video 3 (Video3) and audio 3 (Audio3) can be distributed from the distribution server 300. Any one of the above-described distribution protocols (A) to (E), for example, is used. The acquisition destination information of these video and audio is included in the information of the corresponding asset of the MPT.

Figure 22:
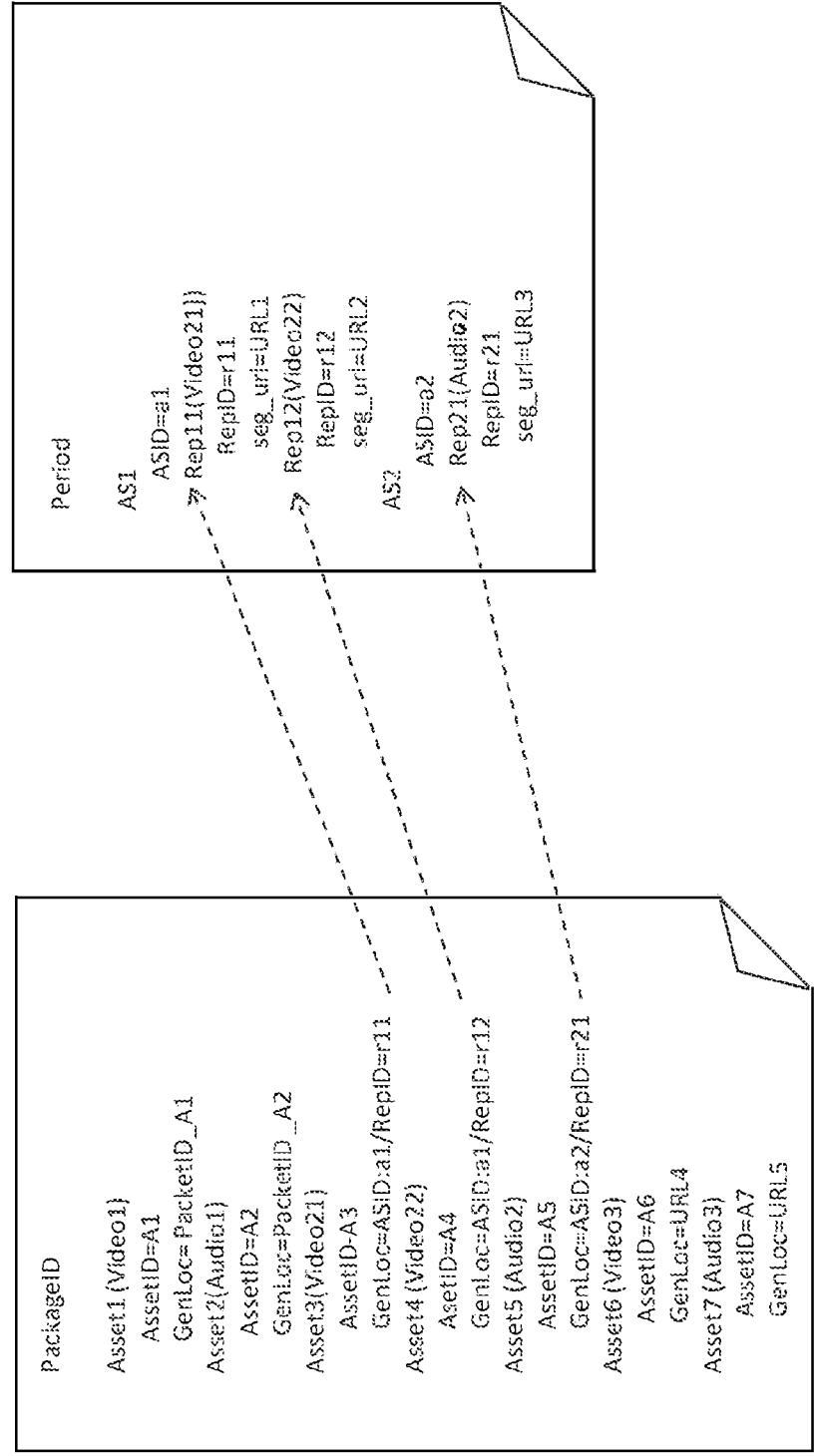
FIG. 22 is a diagram schematically illustrating a configuration example of an MPT and an MPD file when an information location of a specific representation of the MPD file is designated by a corresponding asset of the MPT.

FIG. 22 schematically illustrates a configuration example of an MPT and an MPD file corresponding to the signal configuration example illustrated in FIG. 21. This example is an example in which the information location of a specific representation of the MPD file is designated by the corresponding asset of the MPT as an acquisition destination of the video 21 (Video21) and the video 22 (Video22) which are the targets of adaptive switching (Method 1).

The information of adaptation set 1 (AS1) and adaptation set 2 (AS2) is included in the MPD file. Moreover, the information of the adaptation set 1 (AS1) includes an adaptation set ID (ASID), representation 11 (Rep11) associated with the video 21 (Video21), and representation 12 (Rep12) associated with the video 22 (Video22).

Moreover, the information of the representation 1 (Rep11) includes a representation ID (RepID-r11) and acquisition destination information (seq_url-URL1). Furthermore, the information of the representation 2 (Rep12) includes a representation ID (RepID-r12) and acquisition destination information (seg_url=URL2).

Moreover, the information of the adaptation set 2 (AS2) includes an adaptation set ID (ASID) and representation 21 (Rep21) associated with the audio 2 (Audio2). Furthermore, the information of the representation 21 (Rep21) includes a representation ID (RepID=r21) and acquisition destination information (seq_url=URL3).

The MPT includes information of asset1 (Asset1) associated with video 1 (Video1), asset 2 (Asset2) associated with audio 1 (Audio1), asset 3 (Asset3) associated with video 21 (Video21), asset 4 (Asset4) associated with video 22 (Video22), asset 5 (Asset5) associated with audio 2 (Audio2), asset 6 (Asset6) associated with video 3 (Video3), and asset 7 (Asset7) associated with audio 3 (Audio3).

The information of asset 1 (Asset1) includes an asset ID (AssetID=A1) and a packet identifier (PacketID_A1) as location information (GenLoc). The information of asset 2 (Asset2) includes an asset ID (AssetID=A2) and a packet identifier (PacketID_A2) as location information (GenLoc).

The information of asset 3 (Asset3) includes an asset ID (AssetID=A3), an adaptation set ID (ASID=a1) as location information (GenLoc), and a representation ID (RepID=r11). The information of asset 4 (Asset4) includes an asset ID (AssetID=A4), an adaptation set ID (ASID=a1) as location information (GenLoc1), and a representation ID (RepID=r12).

The information of asset 5 (Asset5) includes an asset ID (AssetID=A5), an adaptation set ID (ASID=a2) as location information (GenLoc), and a representation ID (RepID=r21). The information of asset 6 (Asset6) includes an asset ID (AssetID=A6) and a URL (URL4) as location information (GenLoc). The information of asset 7 (Asset7) includes an asset ID (AssetID=A7) and a URL (URL5) as location information (GenLoc).

Figure 23:
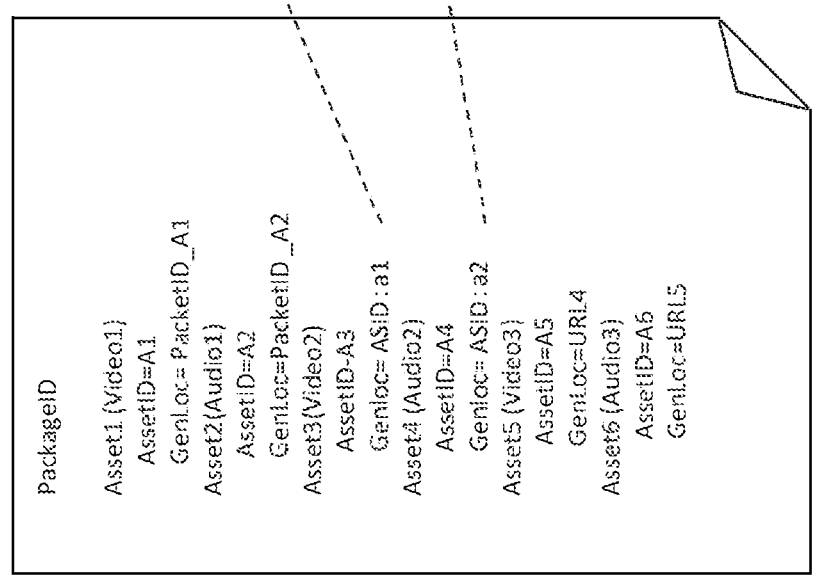
FIG. 23 is a diagram schematically illustrating a configuration example of an MPT and an MPD file when an information location of a specific adaptation set of the MPD file is designated by a corresponding asset of the MPT.

FIG. 23 schematically illustrates a configuration example of an MPT and an MPD file corresponding to the signal configuration example illustrated in FIG. 21. This example is an example in which the information location of a specific adaptation set of the MPD file is designated by the corresponding asset of the MPT as the acquisition destination of the video 21 (Video21) and the video 22 (Video22) which are the targets of adaptive switching (Method 2).

The MPD file includes information similar to those illustrated in FIG. 22. The MPT includes information of asset 1 (Asset1) associated with video 1 (Video1), asset 2 (Asset2) associated with audio 1 (Audio1), asset 3 (Asset3) associated with video 22 (Video21, Video22), asset 4 (Asset4) associated with audio 2 (Audio2), asset5 (Asset5) associated with video 3 (Video3), and asset 6 (Asset6) associated with audio 3 (Audio3).

The information of asset 1 (Asset1) includes an asset ID (AssetID=A1) and a packet identifier (PacketID=A1) as location information (GenLoc). The information of asset 2 (Asset2) includes an asset ID (AssetID-A2) and a packet identifier (PacketID_A2) as location information (GenLoc).

The information of asset 3 (Asset3) includes an asset ID (AssetID=A3) and an adaptation set ID (ASID=a1) as location information (GenLoc). The information of asset 4 (Asset4) includes an asset ID (AssetID=A4) and an adaptation set ID (ASID=a2) as location information (GenLoc). The information of asset 5 (Asset5) includes an asset ID (AssetID=A5) and a URL (URL4) as location information (GenLoc). The information of asset 6 (Asset6) includes an asset ID (AssetID=A6) and a URL (URL5) as location information (GenLoc).

As described above, the descriptor used as the component selection information includes a view descriptor, a composite component type descriptor, an asset group descriptor, a dependency descriptor, a video component descriptor, an audio component descriptor, a target device descriptor, a target region descriptor, a parental rating descriptor, and the like.

The view descriptor is a descriptor in which meta-information related to a view of a video is described. The composite component type descriptor is a descriptor in which information indicating a composition type is described. The asset group descriptor is a descriptor in which information indicating the relation of asset groups and the priority in a group is described. The dependency descriptor is a descriptor that provides asset IDs of assets which are in dependency.

The video component descriptor is a descriptor indicating parameters and description of the video component. The audio component descriptor is a descriptor indicating parameters of an audio elementary stream. The target device descriptor is a descriptor in which information on a target device that reproduces a corresponding component is described. The target region descriptor is a descriptor in which information indicating a target region in which the corresponding component is reproduced is described. The parental rating descriptor is a descriptor in which rating information of the corresponding component is described.

FIG. 24 illustrates a structure example (syntax) of a view descriptor. This view descriptor is a descriptor which is newly defined in this embodiment. The 16-bit field "descriptor_tag" indicates a descriptor tag. In this example, this field indicates that the descriptor is a view descriptor. The 8-bit field "descriptor_length" indicates a descriptor length and indicates the number of bytes after this field.

The 8-bit field "view_tag" indicates a view tag which is identification information of a video content. Videos having the same content may have different rates and may use different codecs. If videos have the same view tag, the videos have the same content. Character string data of a view name which is the name of a video content is disposed in the field "view_name_byte".

FIG. 25 illustrates a structure example (syntax) of the composite component type descriptor. The composite component type descriptor is a descriptor which is newly defined in this embodiment. The 16-bit field "descriptor_tag" indicates a descriptor tag. In this example, this field indicates that the descriptor is a composite component type descriptor. The 8-bit field "descriptor_length" indicates a descriptor length and indicates the number of bytes after this field. The 8-bit field "composite_component_type" indicates a composite component type. For example, this field indicates types such as scalable, 3D, tile, layer, mixing, and the like.

FIG. 26 illustrates a structure example (syntax) of the asset group descriptor. This asset group descriptor is an existing descriptor. The 16-bit field "descriptor_tag" indicates a descriptor tag. In this example, this field indicates that the descriptor is an asset group descriptor. The 8-bit field "descriptor_length" indicates a descriptor length and indicates the number of bytes after this field.

The 8-bit field "group_identification" indicates a group ID. For example, this field indicates an ID that groups assets such as video, audio, and the like. The 8-bit field "selection_level" indicates a selection level. An asset of which the selection level value is "0" is selected as a default asset. When it is not possible to select a default asset, candidates are selected in ascending order of asset numbers in a group.

FIG. 27 illustrates a structure example (syntax) of the dependency descriptor. The dependency descriptor is an existing descriptor. The 16-bit field "descriptor_tag" indicates a descriptor tag. In this example, this field indicates that the descriptor is a dependency descriptor. The 16-bit field "descriptor_length" indicates a descriptor length and indicates the number of bytes after this field.

The 8-bit field "num_dependencies" indicates the number of dependent assets. This field indicates the number of assets which are in a complementary relation with an asset in which this descriptor is inserted. A for-loop is disposed after this field and information on each complementary asset is defined. The 32-bit field "asset_id_scheme" indicates the format of an asset ID of a complementary asset. The 8-bit field "asset_id_length" indicates the length of an asset ID byte of a complementary asset in byte units. The field "asset_id_byte" indicates an asset ID of a complementary asset.

FIG. 28 illustrates a structure example (syntax) of the video component descriptor. The video component descriptor is an existing descriptor. The 16-bit field "descriptor_tag" indicates a descriptor tag. In this example, this field indicates that the descriptor is a video component descriptor. The 16-bit field "descriptor_length" indicates a descriptor length and indicates the number of bytes after this field.

The 4-bit field "video_resolution" indicates a resolution in a vertical direction. For example, "1" indicates "180," "2" indicates "240," "3" indicates "480," "4" indicates "720," "5" indicates "1080," "6" indicates "2160," and "7" indicates "4320". The 4-bit field "video_aspect_ratio" indicates an aspect ratio. For example, "1" indicates "4:3," "2" indicates "16:9 with pan vectors (PV)," "3" indicates "16:9 without pan vectors (PV)," and "4" indicates "16:9 or higher".

The 1-bit field "video_scan_flag" indicates a scan flag. For example, "0" indicates interlace and "1" indicates progressive. The 5-bit field "video_frame_rate" indicates a frame rate. For example, "4" indicates "25 frames," "5" indicates "30/1.001 frames," "6" indicates "30 frames," "7" indicates "50 frames," "8" indicates "60/1.001 frames," and "9" indicates "60 frames".

The 16-bit field "component_tag" indicates a component tag. The component tag is a label for identifying a component stream. The 24-bit field "ISO_639_language_code" indicates a language code. The field "text_char" defines a character description of a component stream.

FIG. 29 illustrates a structure example (syntax) of the audio component descriptor. This audio component descriptor is an existing descriptor. The 16-bit field "descriptor_tag" indicates a descriptor tag. In this example, this field indicates that the descriptor is an audio component descriptor. The 16-bit field "descriptor_length" indicates a descriptor length and indicates the number of bytes after this field.

The 4-bit field "stream_content" indicates a type of a stream. The 8-bit field "component_type" defines the type of an audio component. The 16-bit field "component_tag" is a label for identifying a component stream. The 8-bit field "stream_type" indicates the format of an audio stream using "stream_type" defined in ISO/IEC 13818-1.

The 8-bit field "simulcast_group_tag" is a simulcast group identifier. The same number is assigned to components that perform simulcast (transporting the same content according to different coding schemes). "0xFF" is assigned to components that do not perform simulcast. The 1-bit field "ES_multi_lingual_flag" indicates an ES multi-lingual flag. For example, "1" indicates a case in which two languages are multiplexed in dual mono. The 1-bit field "main_component_flag" indicates whether the audio component is main audio, and "1" is assigned when the audio component is main audio.

The 2-bit field "quality_indicator" indicates audio quality mode. For example, "1" indicates "Mode 1," "2" indicates "Mode 2," and "3" indicates "Mode 3". The 3-bit field "sampling rate" indicates a sampling frequency. For example, "1" indicates "16 kHz," "2" indicates "22.05 kHz," "3" indicates "24 kHz," "5" indicates "32 kHz," "6" indicates "44.1 kHz," and "7" indicates "48 kHz".

The 24-bit field "ISO_639_language_code" indicates a language code. Moreover, when "ES_multi_lingual_flag" is "1," the 24-bit field "ISO_639_language_code_2" is present and indicates Language code 2. The field "text_char" defines a character description of a component stream.

FIG. 30 illustrates a structure example (syntax) of the target device descriptor. This target device descriptor is a descriptor which is newly defined in this embodiment. The 16-bit field "descriptor_tag" indicates a descriptor tag. In this example, this field indicates that the descriptor is a target device descriptor. The 8-bit field "descriptor_length" indicates a descriptor length and indicates the number of bytes after this field.

The 8-bit field "number_of_taget_device" indicates the number of target devices. The 8-bit field "target_device_type" is present for each target device and indicates a target device type. For example, this field indicates a type whether a television with a large screen is assumed, a tablet having a smaller screen is assumed, or a smartphone having a further smaller screen is assumed.

FIG. 31 illustrates a structure example (syntax) of the target region descriptor. The target region descriptor is an existing descriptor. The 16-bit field "descriptor_tag" indicates a descriptor tag. In this example, this field indicates that the descriptor is a target region descriptor. The 8-bit field "descriptor_length" indicates a descriptor length and indicates the number of bytes after this field.

The 8-bit field "region_spec_type" indicates a designation of a region description scheme. For example, "1" indicates that a prefectural area is designated. Moreover, a region specifier (region specifying data) based on the designated description scheme is described in the field "target_region_spec( )".

FIG. 32 illustrates a structure example (syntax) of the parental rating descriptor. The parental rating descriptor is an existing descriptor. The 16-bit field "descriptor_tag" indicates a descriptor tag. In this example, this field indicates that the descriptor is a parental rating descriptor. The 8-bit field "descriptor_length" indicates a descriptor length and indicates the number of bytes after this field.

Rating can be designated for each country. The 24-bit field "country_code" indicates a country code. The 8-bit field "rating" indicates a rating. A "rating+3 years old" indicates the lower-limit age.

[Configuration of Broadcast Transmission System]

Figure 33:
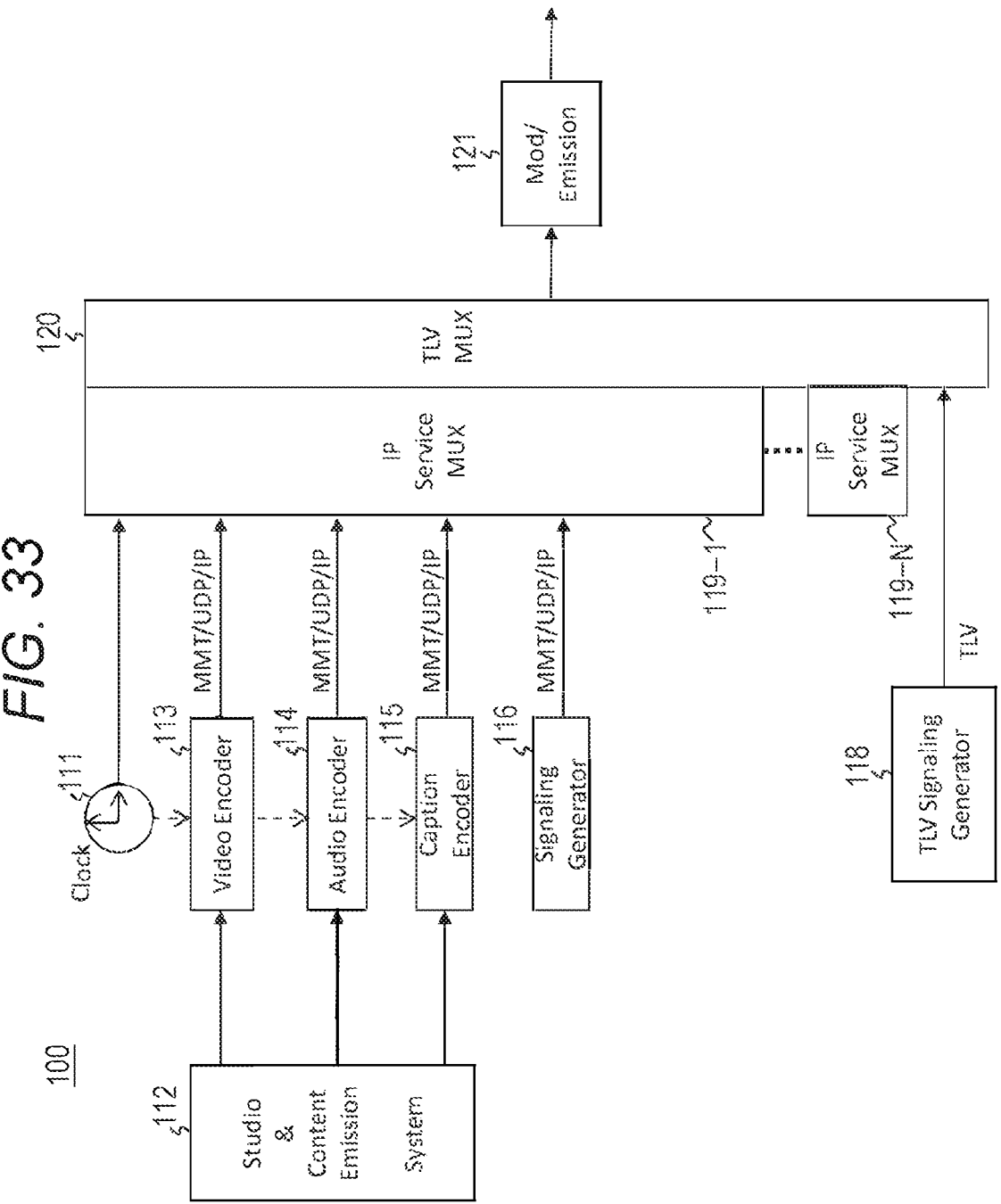
FIG. 33 is a block diagram illustrating a configuration example of a broadcast transmission system that forms a broadcast and communication hybrid system.

FIG. 33 illustrates a configuration example of the broadcast transmission system 100. The broadcast transmission system 100 includes a clock unit 111, a signal transmission unit 112, a video encoder 113, an audio encoder 114, a caption encoder 115, and a signaling generator 116. Moreover, this broadcast transmission system 100 includes a TLV signaling generator 118, NIP service multiplexers 119-1 to 119-N, a TLV multiplexer 120, and a modulation/transmission unit 121.

The clock unit 111 generates time information (NTP time information) synchronized with the time information acquired from a network time protocol (NTP) server (not illustrated) and transmits an IP packet including the time information to the IP service multiplexer 119-1. The signal transmission unit 112 is a studio of a TV station or a recording and reproduction apparatus such as a VTR, for example, and transmits stream data such as video, audio, caption, and the like which are timed media and files (file data) such as HTML document data and the like which are non-timed media to respective encoders.

The video encoder 113 encodes and packetizes video signals transmitted from the signal transmission unit 112 to obtain an IP packet including a video MMT packet and transmits the IP packet to the IP service multiplexer 119-1. The audio encoder 114 encodes and packetizes audio signals transmitted from the signal transmission unit 112 to obtain an IP packet including an audio MKT packet and transmits the IP packet to the IP service multiplexer 119-1.

The caption encoder 115 encodes and packetizes caption signals (subtitle signals) transmitted from the signal transmission unit 112 to obtain an IP packet including a caption MMT packet and transmits the IP packet to the IP service multiplexer 119-1.

The signaling generator 116 generates a signaling message and transmits an IP packet including an MMT packet in which the signaling message is disposed in the payload portion to the IP service multiplexer 119-1. In this case, the signaling generator 116 generates at least a PA message including an MP table (MPT) and an MPI message including an MPD file.

The IP service multiplexer 119-1 performs time-division multiplexing on the IP packets transmitted from the respective encoders. In this case, the IP service multiplexer 119-1 appends a TLV header to the respective IP packets to form a TLV packet.

The IP service multiplexer 119-1 forms one channel portion which is inserted in one transponder. The IP service multiplexers 119-2 to 119-N have functions similar to that of the IP service multiplexer 119-1 and form the other channel portions to be inserted in the one transponder.

The TLV signaling generator 118 generates signaling information and generates a TLV packet in which the signaling information is disposed in the payload portion. The TLV multiplexer 120 multiplexes the TLV packets generated by the IP service multiplexers 119-1 to 119-N and the TLV signaling generator 118 to generate a broadcast stream. The modulation/transmission unit 121 performs an RF modulation process on the broadcast stream generated by the TLV multiplexer 120 and transmits the broadcast stream to an RF transport path.

The operation of a broadcast transmission system 110 illustrated in FIG. 33 will be described briefly. In the clock unit 111, time information synchronized with the time information acquired from the NTP server is generated and an IP packet including the time information is generated. This IP packet is transmitted to the IP service multiplexer 119-1.

The video signal transmitted from the signal transmission unit 112 is supplied to the video encoder 113. In the video encoder 113, the video signal is encoded and packetized and an IP packet including a video MMT packet is generated. This IP packet is transmitted to the IP service multiplexer 119-1. Moreover, a similar process is also performed on an audio signal transmitted from the signal transmission unit 112. Moreover, an IP packet including the audio MMT packet generated by the audio encoder 114 is transmitted to the IP service multiplexer 119-1.

Moreover, a similar process is also performed on an audio signal and a caption signal transmitted from the signal transmission unit 112. Moreover, an IP packet including the audio MMT packet generated by the audio encoder 114 is transmitted to the IP service multiplexer 119-1, and an IP packet including the caption MMT packet generated by the caption encoder 115 is transmitted to the IP service multiplexer 119-1.

Moreover, in the signaling generator 116, a signaling message is generated, and an IP packet including an MMT packet in which the signaling message is disposed in the payload portion is generated. This IP packet is transmitted to the IP service multiplexer 119-1. In this case, in the signaling generator 116, at least a PA message including an MP table (MPT) and an MPI message including an MPD file are generated.

In the IP service multiplexer 119-1, the IP packets transmitted from the respective encoders and the signaling generator 116 are time-division multiplexed. In this case, a TLV header is appended to the respective IP packets to form a TLV packet. In this IP service multiplexer 119-1, processing is performed on one channel portion to be inserted in one transponder. In the IP service multiplexers 119-2 to 119-N, processing is similarly performed on the other channel portions to be inserted in the one transponder.

The TLV packets obtained by the IP service multiplexers 119-1 to 119-N are transmitted to the TLV multiplexer 120. Furthermore, a TLV packet in which the signaling information is disposed in the payload portion is also transmitted from the TLV signaling generator 118 to the TLV multiplexer 120.

In the TLV multiplexer 120, the TLV packets generated by the IP service multiplexers 119-1 to 119-N and the TLV signaling generator 118 are multiplexed and a broadcast stream is generated. This broadcast stream is transmitted to the modulation/transmission unit 121. In the modulation/transmission unit 121, an RF modulation process is performed on the broadcast stream, and the RF modulation signal is transmitted to an RF transport path.

[Configuration of Reception Terminal]

Figure 34:
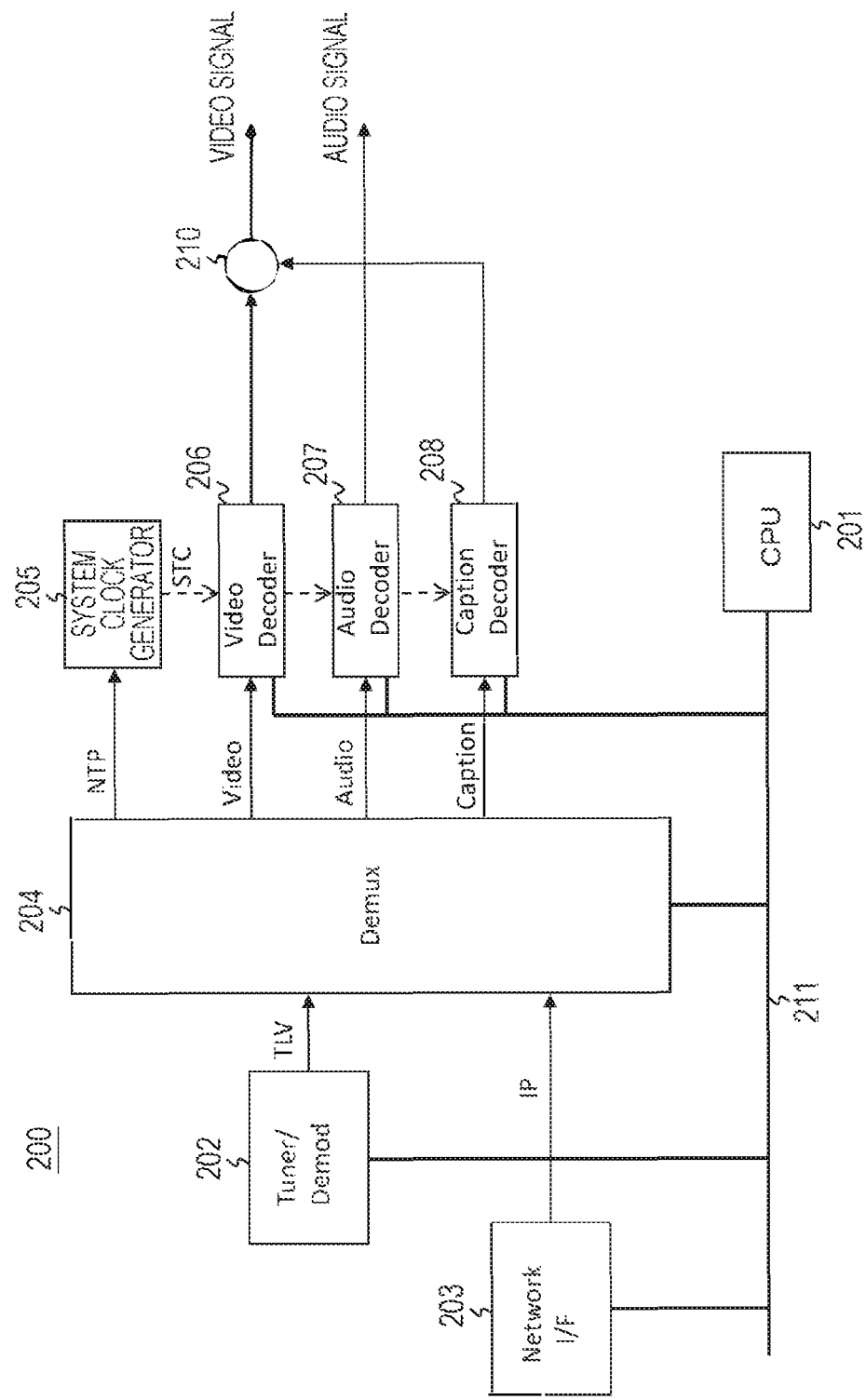
FIG. 34 is a block diagram illustrating a configuration example of a reception terminal that forms the broadcast and communication hybrid system.

FIG. 34 illustrates a configuration example of the reception terminal 200. The reception terminal 200 includes a CPU 201, a tuner/demodulation unit 202, a network interface unit 203, a demultiplexer 204, and a system clock generator 205. Moreover, the reception terminal 200 includes a video decoder 206, an audio decoder 207, a caption decoder 208, and a composition unit 210.

The CPU 201 forms a control unit and controls the operation of the respective units of the reception terminal 200. The tuner/demodulation unit 202 receives an RF modulation signal and performs a demodulation process to obtain a broadcast stream. The network interface unit 203 receives a transport stream of a service distributed from the distribution server 300 or the DASH segment server 400 via the communication network 500.

The demultiplexer 204 demultiplexes and depacketizes the broadcast stream obtained by the tuner/demodulation unit 202 and the transport stream obtained by the network interface unit 203 to output NTP time information, signaling information, and coded video and audio signals.

The system clock generator 205 generates a system clock STC synchronized with the time information on the basis of the NTP time information obtained by the demultiplexer 204. The video decoder 206 decodes the coded video signal obtained by the demultiplexer 204 to obtain a baseband video signal.

The audio decoder 207 decodes the coded audio signal obtained by the demultiplexer 204 to obtain a baseband audio signal. Furthermore, the caption decoder 208 decodes a coded caption signal obtained by the demultiplexer 204 to obtain a caption (subtitle) display signal.

The CPU 201 controls decode timings in the respective decoders on the basis of presentation time information (PTS) to adjust video and audio presentation timings. The composition unit 210 combines a caption display signal with the baseband video signal obtained by the video decoder 206 to obtain a video signal for displaying video. It should be noted that the baseband audio signal obtained by the audio decoder 207 is an audio signal for outputting audio.

The operation of the reception terminal 200 illustrated in FIG. 34 will be described briefly. In the tuner/demodulation unit 202, and RF modulation signal transmitted via the RF transport path is received and demodulated to obtain a broadcast stream. This broadcast stream is transmitted to the demultiplexer 204. Moreover, in the network interface unit 203, a transport stream of a service distributed from the distribution server 300 or the DASH segment server 400 via the communication network 300 is received and is transmitted to the demultiplexer 204.

In the demultiplexer 204, the broadcast stream from the tuner/demodulation unit 202 and the transport stream from the network interface unit 203 are demultiplexed and depacketized whereby NTP time information, signaling information, and coded video and audio signals are extracted.

Various items of signaling information extracted by the demultiplexer 204 are transmitted to the CPU 201 via the CPU bus 211. The signaling information includes TLV-ST and MMT-SI. As described above, the TLV-ST is a transport control signal (TLV-NIT/AMT) carried on the TLV transport packet, and the MMT-SI is a signaling message as signaling information included in the payload portion of the MMT packet (see FIG. 2). The CPU 201 controls the operation of the respective units of the reception terminal 200 on the basis of the signaling information.

The NTP time information extracted by the demultiplexer 204 is transmitted to the system clock generator 205. In the system clock generator 205, a system clock STC synchronized with the time information is generated on the basis of the NTP time information. This system clock STC is supplied to the video decoder 206, the audio decoder 207, and the caption decoder 208.

The coded video signal extracted by the demultiplexer 204 is transmitted to the video decoder 20E in which the video signal is decoded to obtain a baseband video signal. Moreover, the coded caption signal extracted by the demultiplexer 204 is transmitted to the caption decoder 208 in which the caption signal is decoded to obtain a caption display signal.

The video signal obtained by the video decoder 206 is supplied to the composition unit 210. Moreover, the caption display signal obtained by the caption decoder 208 is supplied to the composition unit 210. In the composition unit 210, these signals are combined to obtain a video signal for displaying video. Moreover, the coded audio signal extracted by the demultiplexer 203 is transmitted to the audio decoder 207 in which the audio signal is decoded to obtain a baseband audio signal for outputting audio.

The reception terminal 200 selectively acquires transport media (components) such as video, audio, and the like to be presented from signals received by broadcast and communication hybrid transmission on the basis of the component selection information (information on respective assets) of the MPT and presents images, audio, and the like.

An outline of a component selection and acquisition process in the reception terminal 200 will be described. The reception terminal 200 (the CPU 201) analyzes information of respective assets (components) of the MPT. In selection of components in the selective layer, the reception terminal 200 displays a user selection GUI as necessary to allow a user to select components.

Figure 35A:
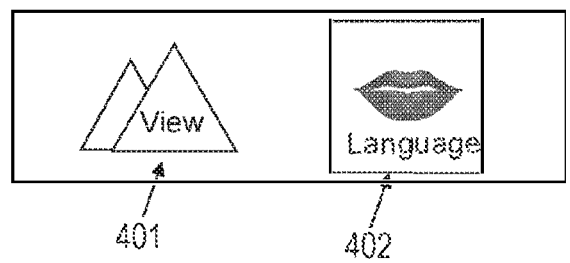
FIGS. 35(a) to 35(c) are diagrams illustrating an example of a component selection GUI.
Figure 35B:
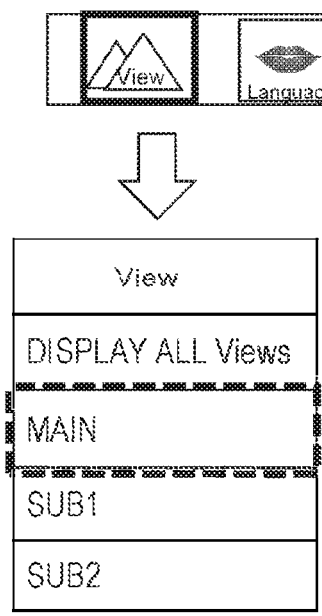

FIG. 35(a) illustrates an example of a component selection GUI. This GUI is used to allow a user to select a view and a language. As illustrated in FIG. 35(b), when a view button 401 on the GUI is operated, a dropdown menu for view selection is displayed, and a user can select any one of "All view display," "Main," "Sub 1," and "Sub 2".

Figure 35C:
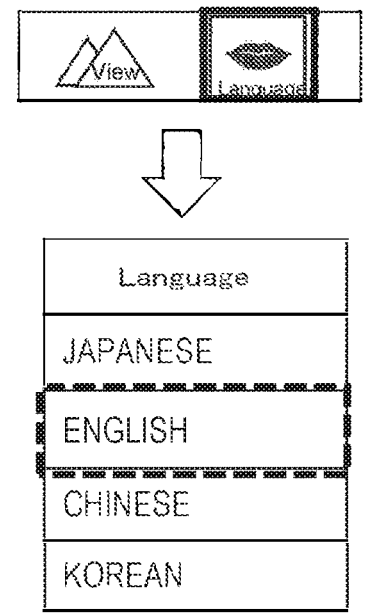

As illustrated in FIG. 35(c), when a language button 402 on the GUI is operated, a dropdown menu for language selection is displayed, and a user can select any one of "Japanese," "English," "Chinese," and "Korean".

Furthermore, the reception terminal 200 selects one or a plurality of components automatically according to capability or setting in selection of components in the selective layer. It should be noted that, when a channel is selected or the power is turned on, the reception terminal 200 selects a default component automatically.

When a plurality of components of the adaptive layer is present in the components selected in the selective layer, the reception terminal 200 calculates components which are the targets of composition and adaptive switching on the basis of the component selection information. Moreover, the reception terminal 200 recognizes a designated acquisition destination (a broadcast and communication MMT packet and a file on the communication network) by the field "General location Info( )" in the asset description of the MPT and acquires and reproduces signal data.

Although the process on video has been described, a similar process is executed on audio, caption, and the like.

Figure 36:
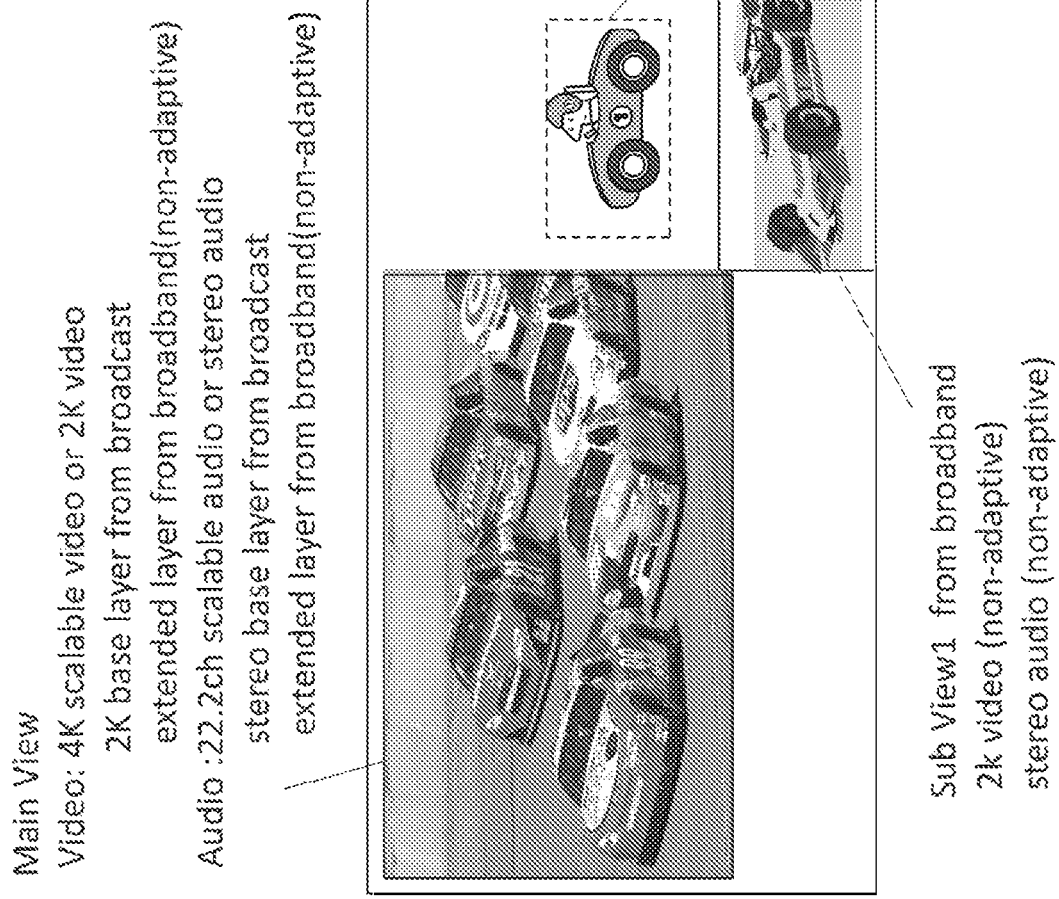
FIG. 36 is a diagram for describing a use case (multiview) of a component selection and acquisition process in a reception terminal.

A use case of the component selection and acquisition process in the reception terminal 200 will be described. This use case is an example of multi-view as illustrated in FIG. 36. In this multi-view example, one program is made up of three "video+audio" including a main view (Main View), a sub view 1 (Sub View1), and a sub view 2 (Sub View2).

The main view video is a default video displayed when a channel is selected, and it is assumed that a video having the 3840*2160 resolution (4K) or the 1920*1080 resolution (2K) is automatically selected according to the capability of the reception terminal. In the case of 4K, scalable coding of combining a 2K video signal (base) and a difference signal (extended) is performed. The 2K video signal (base) is transported via broadcasting and the difference signal (extended) is webcasted.

As for audio associated with the main video, it is assumed that 22.2ch or stereo is automatically selected according to the capability and the connection environment of the reception terminal. In the case of 22.2ch, scalable coding of combining a stereo signal (base) and a difference signal (extended) is performed. The stereo signal is transported via broadcasting (base) and the difference signal (extended) is webcasted.

In the sub view 1, a video signal and an audio signal are webcasted by one system, respectively. In this sub view 1, the video signal is a 2K video signal and the audio signal is a stereo signal. In the sub view 2, a video signal is webcasted while adaptively switching several signals having different rates and resolutions, and an audio signal is webcasted by one system. In this sub view 2, the video signal is a 2K video signal, and the audio signal is a stereo signal.

Figure 37:
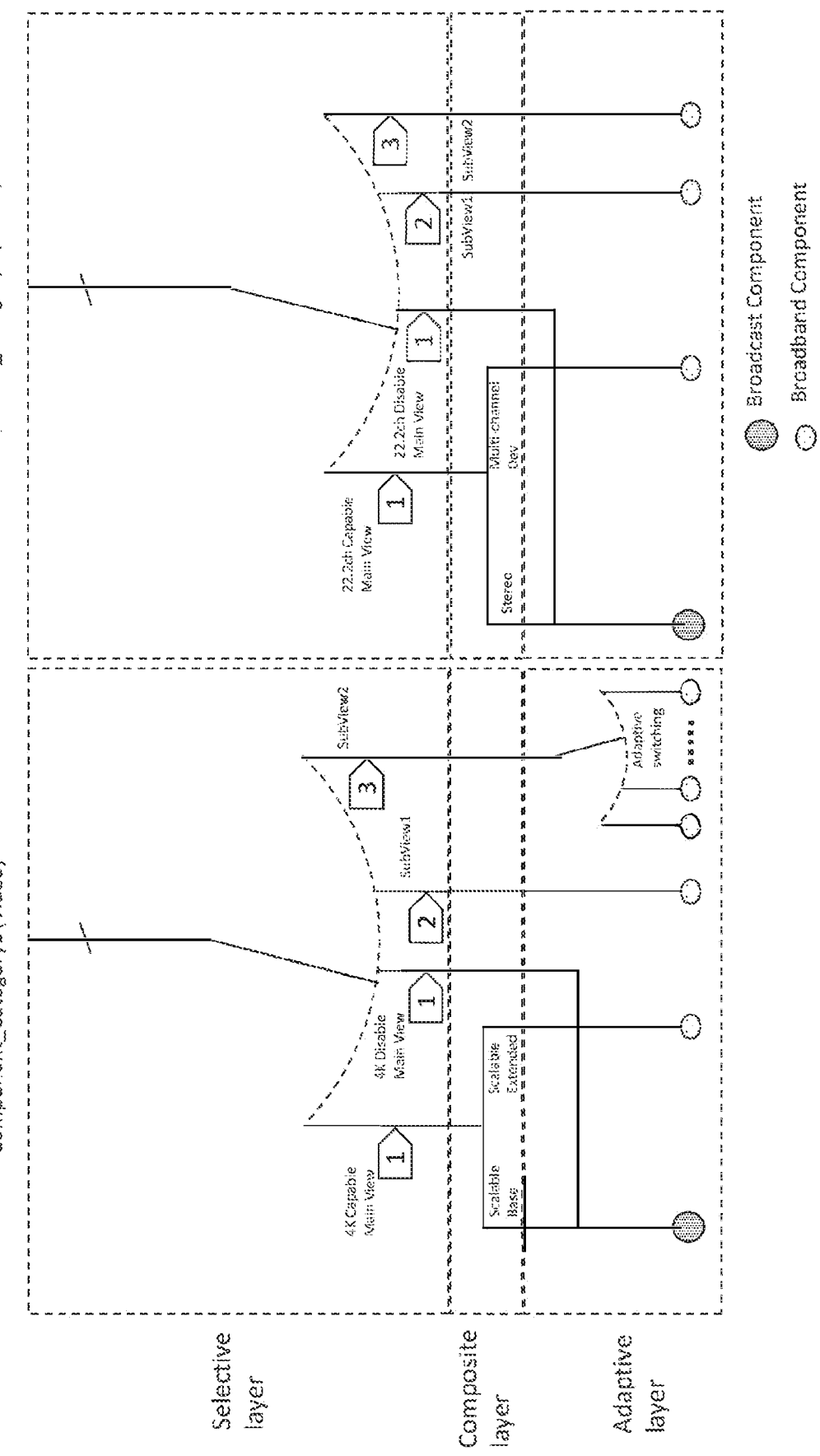
FIG. 37 is a diagram illustrating a component layering model corresponding to an example of multiview.

FIG. 37 illustrates a component layering model corresponding to the multi-view example illustrated in FIG. 36. The component category includes Video and Audio. In the selective layer of video, it is illustrated that a 4K video signal or a 2K video signal can be selected as a main view, and a sub view 1 and a sub view 2 can be selected.

Moreover, in the composite layer and the adaptive layer of video, it is illustrated that a main view (4K video signal) which is a choice in the selective layer is scalable coded and is a composite signal of a base signal (2K video signal) transported via broadcasting and an extended signal (difference signal) transported via communication.

Moreover, in the composite layer and the adaptive layer of video, it is illustrated that a main view (2K video signal) which is a choice in the selective layer is a base signal (2K video signal) transported via broadcasting. Furthermore, in the composite layer and the adaptive layer of video, it is illustrated that a sub view 1 which is a choice in the selective layer is a video signal transported via communication. Furthermore, in the composite layer and the adaptive layer of video, it is illustrated that a sub view 2 which is a choice in the selective layer is a video signal obtained by adaptively switching a plurality of video signals transported via communication.

Moreover, in the selective layer of audio, it is illustrated that a 22.2ch signal or a stereo signal can be selected as a main view, and a sub view 1 and a sub view 2 can be selected.

Moreover, in the composite layer and the adaptive layer of audio, it is illustrated that the main view (22.2ch signal) which is a choice in the selective layer is scalable coded and is a composite signal of a stereo signal transported via broadcasting and a difference signal transported via communication.

Moreover, in the composite layer and the adaptive layer of audio, it is illustrated that the main view (stereo signal) which is a choice in the selective layer is a stereo signal transported via broadcasting. Furthermore, in the composite layer and the adaptive layer of audio, it is illustrated that the sub view 1 and the sub view 2 which are the choices in the selective layer are stereo signals transported via communication.

Moreover, in the selective layer of video and audio, it is illustrated that the respective views are combined by an asset group and are to be selected across categories. That is, it is illustrated that the main view, the sub view 1, and the sub view 2 of audio are to be selected according to the selection of the main view, the sub view 1, and the sub view 2 of video.

Figure 38:
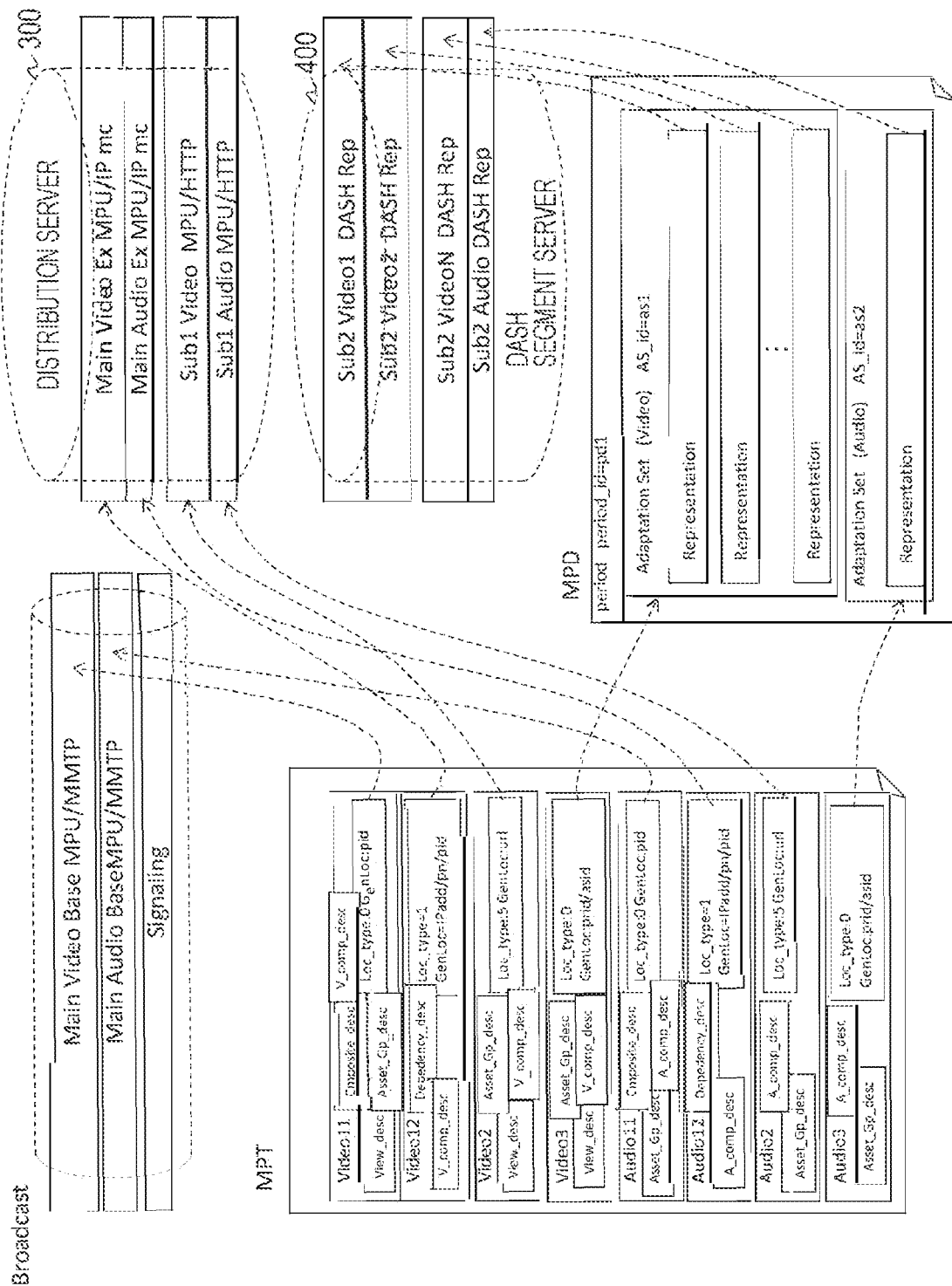
FIG. 38 is a diagram schematically illustrating a description example of an MPT and an MPD file corresponding to the example of multiview.

FIG. 38 schematically illustrates a description example of an MPT and an MPD file corresponding to the multi-view example illustrated in FIG. 36. In the MPD file, the information of a period indicated by the period ID "period_id" of "pd1" includes information of a first adaptation set indicated by the adaptation set ID "As_id" of "as1" and information of a second adaptation set indicated by the adaptation set ID "As_id" of as2.

The first adaptation set corresponds to the video signal of the sub view 3 which is webcasted while adaptively switching several signals having different rates and resolutions. The information of the first adaptation set includes information of a plurality of (N) representations corresponding to the signals having different rates and resolutions. The second adaptation set corresponds to the audio signal of the sub view 3 which is webcasted. The information of the second adaptation set includes information of one representation corresponding to the audio signal.

The MPT includes selection information of the two component categories of video and audio. The video information includes information of respective assets (components) including video 11 (Video11), video 12 (Video12), video 2 (Video2), and video 3 (Video3). The information of the respective assets includes various items of information including a descriptor as the component selection information.

The asset of video 11 (Video11) corresponds to the 2K video signal (base) of the main view which is transported via broadcasting. As information of this asset, the location type "Loc_type" is set to "0," and the packet identifier "pid" is inserted as the location information "GenLoc". Moreover, a view descriptor "View_desc," a composite component type descriptor "Compsite_desc," an asset group descriptor "Asset_Gp_desc," a video component descriptor "V_comp_desc," and the like are inserted as the information of this asset.

The asset of video 12 (Video12) corresponds to the difference signal (extended) of the main view which is webcasted. As information of this asset, the location type "Loc_type" is set to "1," and the IP address "IPadd," the port number "pn," and the packet identifier "pid" are inserted as the location information "GenLoc". This asset is multicast-distributed. Moreover, a dependency descriptor "Dependency_desc," a video component descriptor "V_comp_desc," and the like are inserted as the information of this asset.

The asset of video 2 (Video2) corresponds to the 2K video signal of the sub view 1 which is webcasted. As information of this asset, the location type "Loc_type" is set to "5," and a URL "url" is inserted as the location information "GenLcc". This asset is distributed via MPU/HTTP. Moreover, a view descriptor "View_desc," an asset group descriptor "Asset_Gp_desc," a video component descriptor "V_comp_desc," and the like are inserted as the information of this asset.

The asset of video 3 (Video3) corresponds to the 2K video signal of the sub view 2 which is webcasted while adaptively switching several signals having different rates and resolutions. As information of this asset, the location type "Loc_type" is set to "D," and the information location of the specific adaptation set of the MPD file is designated by the period ID "pid" and the adaptation set ID "asid" as the location information "GenLoc".

In this example, the period ID "pid" is set to "pd1," the adaptation set ID "asid" is set to "as1," and the information location of the adaptation set corresponding to the video signal of the sub view 3 which is webcasted while adaptively switching several signals having different rates and resolutions is designated. In this way, adaptive switching of the video signal of the sub view 3 is performed on the basis of the MPD file. Moreover, a view descriptor "View_desc," an asset group descriptor "Asset_Gp_desc," a video component descriptor "V_comp_desc," and the like are inserted as the information of this asset.

Moreover, the audio information includes information of respective assets (components) including audio 11 (Audio11), audio 12 (Audio12), audio 2 (Audio2), and audio 3 (Audio3). The information of the respective assets includes various items of information including a descriptor as the component selection information.

The asset of audio 11 (Audio11) corresponds to the stereo signal (base) of the main view which is transported via broadcasting. As information of this asset, the location type "Loc_type" is set to "0," and the packet identifier "pid" is inserted as the location information "GrenLoc". Moreover, a composite component type descriptor "Compsite_desc," an asset group descriptor "Asset_Gp_desc," an audio component descriptor "A_comp_desc," and the like are inserted as the information of this asset.

The asset of audio 12 (Audio12) corresponds to the difference signal (extended) of the main view which is webcasted. As information of this asset, the location type "Loc_type" is set to "1," and the IP address "IPadd," the port number "pn," and the packet identifier "pid" are inserted as the location information "GenLoc". This asset is multicast-distributed. Moreover, a dependency descriptor "Dependency_desc," an audio component descriptor "A_comp_desc," and the like are inserted as the information of this asset.

The asset of audio 2 (Audio2) corresponds to the stereo signal of the sub view 1 which is webcasted. As information of this asset, the location type "Loc_type" is set to "5," and a URL "url" is inserted as the location information "GenLoc". This asset is distributed via MPU/HTTP. Moreover, an asset group descriptor "Asset_Gp_desc," an audio component descriptor "A_comp_desc," and the like are inserted as the information of this asset.

The asset of audio 3 (Audio3) corresponds to the stereo signal of the sub view 2. As information of this asset, the location type "Loc_type" is set to "D," and the information location of the specific adaptation set of the MPD file is designated by the period ID "pid" and the adaptation set ID "asid" as the location information "GenLoc".

In this example, the period ID "pid" is set to "pd1," the adaptation set ID "asid" is set to "as2," and the information location of the adaptation set corresponding to the audio signal of the sub view 2 is designated. Moreover, an asset group descriptor "Asset_Gp_desc," an audio component descriptor "A_comp_desc," and the like are inserted as the information of this asset.

Selection and reproduction of components based on the description example of the above-described MPT and the MPD file are performed in the following manner, for example. First, a view is selected. This selection is performed on the basis of the view descriptor "View_desc" inserted in the information of the respective assets of video 11, video 2, and video 3. For example, it is assumed that the main view is selected as a default view and the video 11 is selected. In this case, since the asset information of the video 11 includes the composite component type descriptor "Compsite_desc," it is understood that this video is obtained by composition.

Moreover, the asset information of the video 12 includes the dependency descriptor "Dependency_desc". From this descriptor, it is understood that the video 12 does not function solely but is used depending on other assets (that is, the video 11). In this way, it is understood from the composite component type descriptor "Compsite_desc" and the dependency descriptor "Dependency_desc" that the video 11 and the video 12 are in a scalable video relation.

Furthermore, the asset information of the video 11 and the video 12 includes the video component descriptor "V_comp_desc," and, for example, it is described that the resolution is "2K" for the video 11 and "4K" for the video 12. If the reception terminal 200 is compatible with 4K, both the video 11 and the video 12 are selected and combined and the video is reproduced in 4K. On the other hand, if the reception terminal 200 is compatible with 2K, only the video 11 is selected and the video is reproduced in 2K.

Moreover, the asset information of the video 11 includes the asset group descriptor "Asset_Gp_desc". From this descriptor, it is understood that the video 11 and the audio 11 are combined. When the video 11 is selected, the audio 11 is also selected. When the audio 11 is selected, it is understood that the audio 11 and the audio 12 are in a scalable audio relation from the combination of the composite component type descriptor "Compsite_desc" present in the asset information of the audio 11 and the dependency descriptor "Dependency_desc" present in the asset information of the audio 12.

Furthermore, the asset information of the audio 11 and the audio 12 include the audio component descriptor "A_comp_desc," and, for example, it is described that the mode is "stereo" for the audio 11 and "22.2 channel" for the audio 12. If the reception terminal 200 is compatible with 22.2 channel, both the audio 11 and the audio 12 are selected and combined and the audio is reproduced in 22.2 channel. On the other hand, if the reception terminal 200 is compatible with stereo, only the audio 11 is selected and the audio is reproduced in stereo.

Next, it is assumed that the sub view 2 and the video 3 are selected. In the asset information of the video 3, the information location of the adaptation set of the MPD file having the adaptation set ID "asid" of "as1" is designated as the location information. In this case, although the video signal is acquired from the DASH segment server 400, adaptive switching of the video signal is frequently performed on the basis of the MPD file, and the video is reproduced in 2K.

Moreover, the asset information of the video 3 includes the asset group descriptor "Asset_Gp_desc". From this descriptor, it is understood that the video 3 and the audio 3 are combined. When the video 3 is selected, the audio 3 is also selected. In the asset information of the audio 3, the information location of the adaptation set of the MPD file having the adaptation set ID "asid" of "as2" is designated as the location information. In this case, the audio signal is acquired from the DASH segment server 400 on the basis of the MPD file and the audio is reproduced in stereo.

Next, an example of a change in view display in the reception terminal 200 will be described. FIG. 39(*a*) illustrates a state in which a channel is selected and reproduction of a program is started. In this state, a default main view is displayed, and a user selection GUI is displayed since this program is a multi-view program.

FIG. 39(*b*) illustrates a state in which a user selects a "multi-view" display mode. In this state, a main view, a sub view 1, and a sub view 2 are displayed in a multi-view mode. FIG. 39(*c*) illustrates a state in which the user selects the "sub view 1". In this state, the video of the sub view 1 is displayed on the entire screen.

As described above, in the broadcast and communication hybrid system 10 illustrated in FIG. 1, the component selection information of three layers is inserted in the MP table (MPT). Moreover, the acquisition destination information of the components which are the targets of adaptive switching among the components selectable in the adaptive layer designates the information location of the specific adaptation set or the representation of the MPD file. Due to this, it is possible to allow a reception side to easily select components (particularly, in the adaptive layer) in a broadcast and communication hybrid system, for example.

2. Modified Example

It should be noted that, in the above-described embodiment, an example in which the reception terminal 200 can acquire the MPD file from broadcasting. However, the present technology is not limited to this, but the reception terminal 200 may acquire the MPD file by another method. For example, the reception terminal may acquire the MPD file by communication from a network server associated with the broadcast transmission system 100.

Moreover, the present technology may take the configuration as follows.

(1) A transmission device including:
a transport stream generator that generates a transport stream in which a first transport packet including predetermined components and a second transport packet including signaling information related to the predetermined components are time-division multiplexed;
a transmission unit that transmits the transport stream via a predetermined transport path; and
an information inserter that inserts component selection information to the second transport packet, wherein
the component selection information includes information on a selective layer in which static selection is performed, information on a composite layer in which composition is performed, and information on an adaptive layer in which dynamic switching is performed, these layers being arranged in that order from top to bottom,
information on each component selectable in the adaptive layer includes acquisition destination information, and
the acquisition destination information of a component which is a target of adaptive switching among the components selectable in the adaptive layer is information that designates specific information location of a metafile having data stream acquisition information for adaptive streaming.

(2) The transmission device according to (1), wherein
the transport packet is an MMT packet, and
the component selection information is included in an MPT.

(3) The transmission device according to (2), wherein
the data stream for the adaptive streaming is an MPEG-DASH-base data stream,
the metafile is an MPD file, and
information that designates the specific information location of the metafile is information that designates a specific adaptation set or a specific representation.

(4) The transmission device according to any of (1) to (3), wherein
the predetermined transport path is a broadcast transport path.

(5) A transmission method including:
a transport stream generation step of generating a transport stream in which a first transport packet including predetermined components and a second transport packet including signaling information related to the predetermined components are time-division multiplexed;
a transmission step of transmitting the transport stream via a predetermined transport path by the transmission unit; and
an information insertion step of inserting component selection information to the second transport packet, wherein
the component selection information includes information on a selective layer in which static selection is performed, information on a composite layer in which composition is performed, and information on an adaptive layer in which dynamic switching is performed, these layers being arranged in that order from top to bottom,
information on each component selectable in the adaptive layer includes acquisition destination information, and
the acquisition destination information of a component which is a target of adaptive switching among the components selectable in the adaptive layer is information that designates specific information location of a metafile having data stream acquisition information for adaptive streaming.

(6) A reception device including:
a reception unit that receives a transport stream in which a first transport packet including predetermined components and a second transport packet including signaling information related to the predetermined components are time-division multiplexed via a predetermined transport path, wherein
component selection information is inserted to the second transport packet,
the component selection information includes information on a selective layer in which static selection is performed, information on a composite layer in which composition is performed, and information on an adaptive layer in which dynamic switching is performed, these layers being arranged in that order from top to bottom,
information on each component selectable in the adaptive layer includes acquisition destination information, and
the acquisition destination information of a component which is a target of adaptive switching among the components selectable in the adaptive layer is information that designates specific information location of a metafile having data stream acquisition information for adaptive streaming,
the reception device further including a component selector that selects components to be presented on the basis of the component selection information.

(7) The reception device according to (6), further including a metafile acquirer that acquires the metafile.

(6) The reception device according to (6) or (7), wherein
the component selector displays a selection graphics user interface on a screen when the component selection information includes variations related to a specific attribute to be selected by the user.

(9) The reception device according to any of (6) to (7), wherein
the transport packet is an MMT packet, and
selection information of the components is included in an MPT.

(10) The reception device according to (9), wherein
the data stream for the adaptive streaming is an MPEG-DASH-base data stream,
the metafile is an MPD file, and
information that designates the specific information location of the metafile is information that designates a specific adaptation set or a specific representation.

(11) The reception device according to any of (6) to (10), wherein
the predetermined transport path is a broadcast transport path.

(12) A reception method including:
a reception step of receiving a transport stream in which a first transport packet including predetermined components and a second transport packet including signaling information related to the predetermined components are time-division multiplexed via a predetermined transport path by the reception unit, wherein
component selection information is inserted to the second transport packet,
the component selection information includes information on a selective layer in which static selection is performed, information on a composite layer in which composition is performed, and information on an adaptive layer in which dynamic switching is performed, these layers being arranged in that order from top to bottom,
information on each component selectable in the adaptive layer includes acquisition destination information, and
the acquisition destination information of a component which is a target of adaptive switching among the components selectable in the adaptive layer is information that designates specific information location of a metafile having data stream acquisition information for adaptive streaming,
the reception method further including a component selection step of selecting components to be presented on the basis of the component selection information.

REFERENCE SIGNS LIST

10 Broadcast and communication hybrid system
100 Broadcast transmission system
111 Clock unit
112 Signal transmission unit
113 Video encoder
114 Audio encoder
115 Caption encoder
116 Signaling generator
118 TLV signaling generator
119-1 to 119-N IP service multiplexer
120 TLV multiplexer
121 Modulation/transmission unit
120 Distribution server
200 Reception terminal
201 CPU
202 Tuner/demodulation unit
202 Demultiplexer
203 Network interface unit
204 Demultiplexer
205 System clock generator
206 Video decoder
207 Audio decoder
208 Caption decoder
210 Composition unit
211 CPU bus
300 Distribution server
400 DASH segment server
500 Communication network

The invention claimed is:
1. A reception device, comprising:
receiving circuitry configured to:
receive a radio frequency (RF) modulation signal via an RF transport path and demodulate the received RF modulation signal to obtain a broadcast stream including a broadcast component and broadcast signaling information related to the broadcast component, wherein the broadcast stream is transmitted using a Moving Picture Experts Group (MPEG) Media Transport (MMT) protocol, and the broadcast signaling information includes a Media Presentation Description (MPD) file having a hierarchical structure, the MPD file being a metafile for acquiring an MPEG-Dynamic Adaptive Streaming over Hypertext transfer protocol (DASH)-based data stream; and
control circuitry configured to:
output a user interface configured to select a component including a view of a plurality of views having different viewpoints and/or an audio language of a plurality of audio languages, the user interface being generated based on the MPD file transmitted via the MMT protocol,
acquire, in response to a selection corresponding to a broadband component based on the user interface, a data stream including the broadband component corresponding to the broadcast component via a broadband transport path based on information conveyed by the hierarchical structure of the MPD file, and
output the broadcast component and the broadband component for presentation.

2. The reception device according to claim 1, wherein the hierarchical structure of the MPD file includes at least a period structure, the period structure having information on data of video or audio, an adaptation set structure included in the period structure, the adaptation set structure grouping a stream selection range.

3. The reception device according to claim 1, wherein the broadcast component and the broadcast signaling information are included in at least one MMT packet.

4. The reception device according to claim 1, wherein the MPD file is delivered by a signaling message included in the broadcast signaling information.

5. The reception device according to claim 1, wherein the broadcast component and the broadband component are processed in three layers comprising a selective layer in which static selection is performed, a composite layer in which composition is performed, and an adaptive layer in which dynamic switching is performed, the three layers being arranged in that order from top to bottom.

6. The reception device according to claim 5, wherein the broadcast component and the broadband component are processed based on component selection information included in the broadcast signaling information.

7. The reception device according to claim 6, wherein
the component selection information, which includes information on each of components selectable in the adaptive layer, includes acquisition destination information,
the acquisition destination information of a component, which is a target of adaptive switching among the components selectable in the adaptive layer, is information that designates specific information location of the MPD file having the hierarchical structure for adaptive streaming, and
the control circuitry is further configured to select components to be presented based on the component selection information.

8. The reception device according to claim 1, wherein the broadcast signaling information includes information associating an adaptation set of the MPD file, which corresponds to the broadband component, with the broadcast component.

9. The reception device according to claim 1, wherein the MPD file is acquired by MPD file location information included in the broadcast signaling information.

10. The reception device according to claim 1, wherein the broadcast signaling information includes a first signaling message which associates an adaptation set of the MPD file with the broadcast component and a second signaling message which is used to acquire the MPD file.

11. The reception device according to claim 1, wherein the broadcast component and the broadband component are a part of a same content.

12. The reception device according to claim 1, wherein the user interface includes information for selection of the audio language from a plurality of audio languages based on the broadcast signaling information.

13. The reception device according to claim 12, the user interface includes a dropdown menu configured to select an audio language from the plurality of audio languages.

14. The reception device according to claim 1, wherein the user interface is generated based on an MMT Package Table and includes information for selection of one group of video and audio from a plurality of groups of video and audio.

15. The reception device according to claim 14, wherein video or audio included in at least one of the plurality of groups of video and audio is coded by scalable coding so that a base portion of the video or audio is transmitted via the RF transport path and an extended portion of the video or audio is transmitted via the broadband transport path.

16. The reception device according to claim 1, wherein the user interface includes information for selection of a caption from a plurality of captions based on the broadcast signaling information.

17. A reception method, comprising:
receiving, by receiving circuitry, a radio frequency (RF) modulation signal via an RF transport path and demodulating the received RF modulation signal to obtain a broadcast stream including a broadcast component and broadcast signaling information related to the broadcast component, wherein the broadcast stream is transmitted using a Moving Picture Experts Group (MPEG) Media Transport (MMT) protocol, and
the broadcast signaling information includes a Media Presentation Description (MPD) file having a hierarchical structure, the MPD file being a metafile for acquiring an MPEG-Dynamic Adaptive Streaming over Hypertext transfer protocol (DASH)-based data stream;
outputting, by control circuitry, a user interface configured to select a component including a view of a plurality of views having different viewpoints and/or an audio language of a plurality of audio languages, the user interface being generated based on the MPD file transmitted via the MMT protocol;
acquiring, by the control circuitry, a data stream including a broadband component corresponding to the broadcast component via a broadband transport path based on information conveyed by the hierarchical structure of the MPD file, in response to a selection corresponding to the broadband component based on the user interface; and
outputting, by the control circuitry, the broadcast component and the broadband component for presentation.

18. The reception method according to claim 17, wherein the hierarchical structure of the MPD file includes at least a period structure, the period structure having information on data of video or audio, an adaptation set structure included in the period structure, the adaptation set structure grouping a stream selection range.

19. The reception method according to claim 17, the user interface includes information for selection of the audio language from a plurality of audio languages based on the broadcast signaling information.

20. The reception method according to claim 17, wherein the broadcast signaling information includes information associating an adaptation set of the MPD file, which corresponds to the broadband component, with the broadcast component.

* * * * *